United States Patent
Kawai et al.

(10) Patent No.: US 9,114,565 B2
(45) Date of Patent: Aug. 25, 2015

(54) PROCESS FOR FORMING UNEVEN STRUCTURE ON SURFACE OF SURFACE LAYER OF CYLINDRICAL ELECTROPHOTOGRAPHIC PHOTOSENSITIVE MEMBER, AND PROCESS FOR PRODUCING CYLINDRICAL ELECTROPHOTOGRAPHIC PHOTOSENSITIVE MEMBER HAVING UNEVEN STRUCTURE FORMED ON SURFACE OF SURFACE LAYER OF SAME

(75) Inventors: Yasuhiro Kawai, Abiko (JP); Hiroki Uematsu, Mishima (JP); Harunobu Ogaki, Suntou-gun (JP); Koji Takahashi, Kashiwa (JP); Tsutomu Nishida, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 335 days.

(21) Appl. No.: 13/881,716

(22) PCT Filed: Nov. 18, 2011

(86) PCT No.: PCT/JP2011/077269
§ 371 (c)(1),
(2), (4) Date: Apr. 25, 2013

(87) PCT Pub. No.: WO2012/070663
PCT Pub. Date: May 31, 2012

(65) Prior Publication Data
US 2013/0221560 A1 Aug. 29, 2013

(30) Foreign Application Priority Data

Nov. 26, 2010 (JP) .................. 2010-264131
Jan. 19, 2011 (JP) .................. 2011-008851
Feb. 17, 2011 (JP) .................. 2011-031839
Nov. 9, 2011 (JP) .................. 2011-245723

(51) Int. Cl.
*B29C 59/02* (2006.01)
*G03G 5/147* (2006.01)

(52) U.S. Cl.
CPC .............. *B29C 59/021* (2013.01); *G03G 5/147* (2013.01)

(58) Field of Classification Search
CPC .............................. B29C 59/021; G03G 5/147
See application file for complete search history.

(56) References Cited

U.S. PATENT DOCUMENTS

| 4,438,188 A | 3/1984 | Shimatani et al. |
| 4,804,607 A | 2/1989 | Atsumi |

(Continued)

FOREIGN PATENT DOCUMENTS

| CN | 1148192 A | 4/1997 |
| JP | 56-111853 A | 9/1981 |

(Continued)

OTHER PUBLICATIONS

Chinese Office Action dated Oct. 10, 2014 in Chinese Application No. 201180057032.X.

(Continued)

*Primary Examiner* — Ryan Ochylski
(74) *Attorney, Agent, or Firm* — Fitzpatrick, Cella, Harper and Scinto

(57) ABSTRACT

In the case where an uneven structure is formed on the surface of cylindrical electrophotographic photosensitive members, for the purpose of reducing the variation of the uneven structure between the individual cylindrical electrophotographic photosensitive members even when a large number of cylindrical electrophotographic photosensitive members are continuously processed, an insert is inserted into the interior of a cylindrical electrophotographic photosensitive member including a cylindrical substrate and a surface layer, the surface uneven structure of a molding member is transferred to and formed on the surface of the surface layer of the photosensitive member. The insert includes an abutting part having an outer peripheral surface capable of abutting on the inner peripheral surface of the substrate, a connecting part positioned inside of the abutting part in the radical direction and a shaft part positioned inside of the connecting part in the radical direction.

11 Claims, 4 Drawing Sheets

(56) References Cited

U.S. PATENT DOCUMENTS

| | | | |
|---|---|---|---|
| 5,773,175 A | 6/1998 | Taniguchi et al. | |
| 5,842,962 A | 12/1998 | Yamada et al. | |
| 6,110,628 A | 8/2000 | Sekiya et al. | |
| 6,180,303 B1 | 1/2001 | Uematsu et al. | |
| 6,311,615 B1 * | 11/2001 | Hilliard | 101/212 |
| 6,372,397 B1 | 4/2002 | Maruyama et al. | |
| 6,416,915 B1 | 7/2002 | Kikuchi et al. | |
| 6,436,597 B2 | 8/2002 | Maruyama et al. | |
| 6,991,881 B2 | 1/2006 | Ogaki et al. | |
| 6,994,941 B2 | 2/2006 | Tanaka et al. | |
| 7,001,699 B2 | 2/2006 | Tanaka et al. | |
| 7,045,261 B2 | 5/2006 | Tanaka et al. | |
| 7,186,489 B2 | 3/2007 | Uematsu et al. | |
| 7,226,711 B2 | 6/2007 | Amamiya et al. | |
| 7,378,205 B2 | 5/2008 | Sekiya et al. | |
| 7,413,840 B1 | 8/2008 | Ogaki et al. | |
| 7,534,534 B2 | 5/2009 | Nakata et al. | |
| 7,551,878 B2 | 6/2009 | Ogaki et al. | |
| 7,553,594 B2 | 6/2009 | Ogaki et al. | |
| 7,556,901 B2 | 7/2009 | Anezaki et al. | |
| 7,563,553 B2 | 7/2009 | Kikuchi et al. | |
| 7,585,604 B2 | 9/2009 | Ogaki et al. | |
| 7,622,238 B2 | 11/2009 | Uematsu et al. | |
| 7,629,102 B2 | 12/2009 | Ochi et al. | |
| 7,645,547 B2 | 1/2010 | Okuda et al. | |
| 7,655,370 B2 | 2/2010 | Kitamura et al. | |
| 7,704,657 B2 | 4/2010 | Uesugi et al. | |
| 7,718,331 B2 | 5/2010 | Uematsu et al. | |
| 7,749,667 B2 | 7/2010 | Kawahara et al. | |
| 7,799,496 B2 | 9/2010 | Uesugi et al. | |
| 7,838,190 B2 | 11/2010 | Ogaki et al. | |
| 7,875,410 B2 | 1/2011 | Ogaki et al. | |
| 7,927,774 B2 | 4/2011 | Ogaki et al. | |
| 7,931,848 B2 | 4/2011 | Ochi et al. | |
| 8,457,528 B2 | 6/2013 | Ochi et al. | |
| 2008/0096123 A1 | 4/2008 | Shimada et al. | |
| 2010/0062171 A1 | 3/2010 | Kaku et al. | |
| 2011/0158683 A1 | 6/2011 | Okuda et al. | |
| 2011/0177438 A1 | 7/2011 | Noguchi et al. | |
| 2012/0301181 A1 | 11/2012 | Ogaki et al. | |
| 2012/0301182 A1 | 11/2012 | Anezaki et al. | |
| 2013/0029256 A1 | 1/2013 | Tanaka et al. | |
| 2013/0029266 A1 | 1/2013 | Sugiyama et al. | |
| 2013/0202326 A1 | 8/2013 | Shida et al. | |
| 2013/0202327 A1 | 8/2013 | Murai et al. | |
| 2013/0236823 A1 | 9/2013 | Noguchi et al. | |

FOREIGN PATENT DOCUMENTS

| | | |
|---|---|---|
| JP | 56-117242 A | 9/1981 |
| JP | 63-91666 A | 4/1988 |
| JP | 8-305044 A | 11/1996 |
| JP | 2001-66814 A | 3/2001 |
| JP | 2003-233207 A | 8/2003 |
| JP | 2004-288784 A | 10/2004 |
| JP | 2006-256813 A | 9/2006 |
| JP | 2007-233356 A | 9/2007 |
| JP | 2009-205167 A | 9/2009 |
| WO | 2008/117806 A1 | 10/2008 |

OTHER PUBLICATIONS

PCT International Search Report and Written Opinion of the International Searching Authority, International Application No. PCT/JP2011/077269, Mailing Date Jan. 10, 2012.

* cited by examiner

FIG. 3
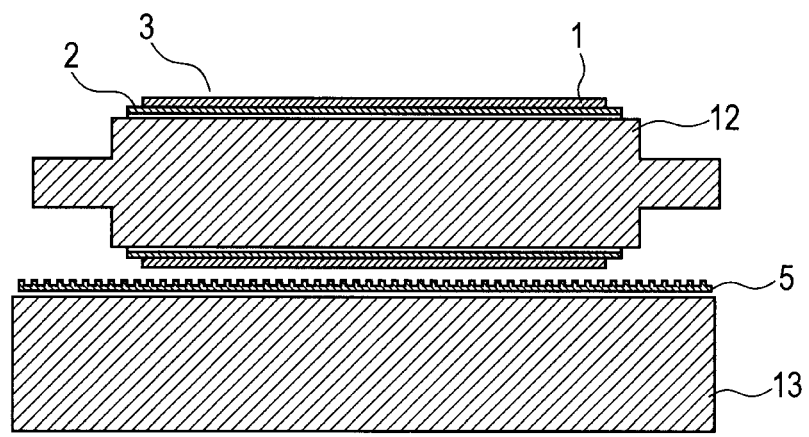
FIG. 4
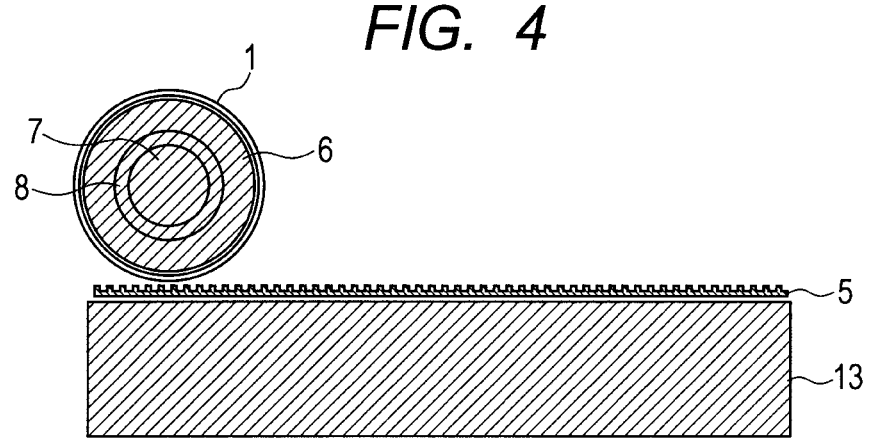
FIG. 5A   FIG. 5B   FIG. 5C
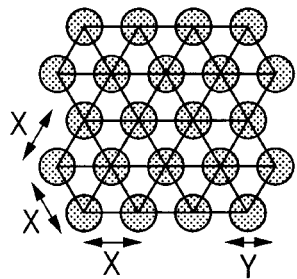 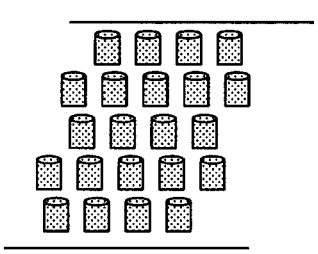 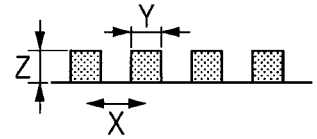

PROCESS FOR FORMING UNEVEN STRUCTURE ON SURFACE OF SURFACE LAYER OF CYLINDRICAL ELECTROPHOTOGRAPHIC PHOTOSENSITIVE MEMBER, AND PROCESS FOR PRODUCING CYLINDRICAL ELECTROPHOTOGRAPHIC PHOTOSENSITIVE MEMBER HAVING UNEVEN STRUCTURE FORMED ON SURFACE OF SURFACE LAYER OF SAME

TECHNICAL FIELD

The present invention relates to a process for forming an uneven structure on the surface of the surface layer of a cylindrical electrophotographic photosensitive member, and a process for producing the cylindrical electrophotographic photosensitive member having an uneven structure formed on the surface of the surface layer thereof.

BACKGROUND ART

As electrophotographic photosensitive members, general are cylindrical electrophotographic photosensitive members (hereinafter, also simply referred to as "electrophotographic photosensitive members") each including a photosensitive layer formed on a cylindrical substrate. Among electrophotographic photosensitive members, organic electrophotographic photosensitive members including photosensitive layers (organic photosensitive layers) using organic materials as photoconductive materials (charge generating materials and charge transporting materials) have come into wide use. As organic electrophotographic photosensitive members, because of the advantages involving high sensitivity and versatility of material design, predominantly used are electrophotographic photosensitive members each having a laminated photosensitive layer formed by laminating a charge generating layer including a charge generating material and a charge transporting layer including a charge transporting material.

In the image forming process, electrophotographic photosensitive members are used in the repeated cycles of the processes of charging, exposing, developing, transferring and cleaning (and charge removing). In particular, the cleaning process for removing the residual toner staying on the surface of the electrophotographic photosensitive member after the transfer process is an important process for the purpose of obtaining clear images. As the cleaning method, common are the methods in each of which a rubber cleaning blade is pressed against the electrophotographic photosensitive member and thus the residual toner is scraped.

However, cleaning blades exhibiting excellent cleaning capability are large in frictional force with the surface of the electrophotographic photosensitive member, and hence tends to cause problems such as the driving torque increase, the slipping away of the toner due to the micro-vibration of the cleaning blade and the inversion of the cleaning blade. The effects of the size reduction and higher performances of toner particles according to a recent trend toward higher image quality on the cleaning performances are also dealt with.

Among the methods for solving the aforementioned problems, there is a method in which the surface of the electrophotographic photosensitive member is appropriately roughened. This method is effective in reducing the contact area between the surface of the electrophotographic photosensitive member and the cleaning blade and in reducing the frictional force.

Various methods are known for such surface roughening of the surface of the electrophotographic photosensitive member; however, in particular, for the purpose of effectively reducing the frictional force, it is necessary to finely control the surface shape and condition of the electrophotographic photosensitive member. As such a method, PTL 1 discloses a technique for compression molding processing by bringing a touch roll or a molding member (a mold) having an uneven structure on the surface thereof into contact with the surface of the electrophotographic photosensitive member. PTL 1 describes an example in which a SUS 304 touch roll having a prismatic and wavy structure is brought into contact with an electrophotographic photosensitive member by applying a force of $2 \times 10^{-4}$ N, and thus, for example, a wavy structure having a pitch of 5 µm and an average depth of 5 µm is formed on the surface of the electrophotographic photosensitive member. PTL 1 also describes an example in which by using a molding member having a well-type structure in which wells having an average one side length of 100 nm and an average depth of 100 nm are formed with an inter-pitch distance of 100 nm, the surface of the electrophotographic photosensitive member was compressed for 2 minutes with a force of 0.8 N, and consequently, there has been formed, on the surface of the electrophotographic photosensitive member, a well-type structure in which wells having an average one side length of 70 nm and a depth of 30 nm are formed with an inter-pitch distance of 120 nm. It has also been disclosed that by heating the electrophotographic photosensitive member and the molding member during processing, the molding accuracy is improved, and the processing pressure is set at 1 N or less for the purpose of maintaining the circularity of the electrophotographic photosensitive member.

The compression molding processing technique disclosed in PTL 1 is an application of a heretofore known technique, to electrophotographic photosensitive members, such as an emboss processing technique, which is an uneven structure processing method for resin surface and others, or a nanoimprint technique which has recently been studied actively as a microprocessing technique.

In general, conventional techniques for performing uneven structure formation processing on the surface of resin films or resin moldings are performed according to the following steps as described in PTL 2:

(1) a resin to be processed is heated to a temperature equal to or higher than the glass transition temperature of the resin (a step of softening the resin so as to easily undergo thermal deformation);

(2) a molding member (a mold) is heated to a temperature equal to or higher than the glass transition temperature of the resin and brought into pressure contact with the resin (a step of penetrating the resin into the fine structures of the molding member);

(3) after a predetermined elapsed time, the resin and the molding member are cooled down to a temperature equal to or lower than the glass transition temperature (a step of fixing the fine structure);

(4) the molding member is released from the resin.

According to the above-described steps, a batch transfer of the fine structure is possible for the whole area of the surface (the surface having the surface structure (uneven structure) corresponding to the uneven structure formed on the surface of the cylindrical electrophotographic photosensitive member) of the molding member, and thus it is possible to process different workpieces separately (a batch method) according to the above-described steps. In sheet-like workpieces, while the workpieces are being moved, the transfer of the surface structure of the whole area of the surface (the surface having the uneven structure) of the molding member can be repeatedly performed (a step-and-repeat method). In the above-described steps, the heating steps and the cooling steps are important. When the heating temperature is low, there tends to occur a problem such that no sufficient surface structure transfer is able to be performed, and when the cooling is not sufficient, there tends to occur a problem such that the transferred surface structure is collapsed. Accordingly, the control conditions in the heating steps and the cooling step are preferably optimized in detail according to the different properties of the resin.

With respect to the temperature control of each of the members being processed, PTL 3 discloses the control methods focusing respectively on the molding member and the workpiece such as a resin film.

When the whole of the surface (the surface having an uneven structure) of the molding member is pressed against the workpiece, the uniformization of the abutting pressure within the area of the surface (the surface having an uneven structure) of the molding member is an important factor. The workpieces in the above-described conventional techniques are assumed to have flat plate shapes or to be flexible materials; however, in the cylindrical electrophotographic photosensitive member, which is the workpiece in the present invention, the surface to be processed has a curvature, and an object to be processed is a resin layer (a surface layer) having a thickness of a few microns to a few tens microns, formed on a cylindrical substrate being comparatively small in the elastic deformation magnitude and having a hardness. Accordingly, it is difficult to perform the contact between such a surface and the molding member, with a satisfactory precision.

For the purpose of overcoming this difficulty, various inventions and improvements have hitherto been made. Among such inventions and improvements, there is a method in which as shown in FIG. 3, a plate-like molding member 5 is bonded onto a flat-plate-like supporting member 13, and a columnar insert 12 is inserted into the interior of (made to pass through) a cylindrical electrophotographic photosensitive member 1, which is a workpiece. In this method, as described in PTL 3, by applying force (pressure), with some sort of unit, toward the molding member, on both end portions of the insert in the axial direction thereof, the surface layer 3 of a cylindrical substrate 2 of the cylindrical electrophotographic photosensitive member 1 is pressurized while being pressed against the molding member 5, across the width of the surface layer 3 along the axial direction of the cylindrical electrophotographic photosensitive member 1.

In this method, the outer diameter of the insert to be inserted into the cylindrical electrophotographic photosensitive member is required to be smaller than the inner diameter of the cylindrical substrate of the cylindrical electrophotographic photosensitive member as the workpiece. The length of the part of the insert, abutting on the cylindrical substrate, is required to be a length approximately corresponding to the length in the axial direction of the cylindrical substrate of the cylindrical electrophotographic photosensitive member. The shape of the insert satisfying such conditions is often long and thin. For example, the inner diameter of the cylindrical substrate of a common cylindrical electrophotographic photosensitive member of approximately 30 mm in inner diameter is approximately 28.5 mm, and the total length of the cylindrical substrate is approximately 360 mm when the cylindrical electrophotographic photosensitive member is to be used for the A3 paper size.

When force is applied to both end portions in the axial direction of such a long and thin insert so as to generate a pressure to press the surface (the outer peripheral surface) of the cylindrical electrophotographic photosensitive member against the molding member, such pressure tends to be unevenly applied to the vicinity of both end portions. Consequently, the depth of the uneven structure formed on the surface of the cylindrical electrophotographic photosensitive member is different, for example, in the vicinity of the central portion and in the vicinity of the end portions in the axial direction. For the purpose of suppressing such an uneven location of the pressure in the end portions and thus generating a uniform pressure distribution in the axial direction of the cylindrical electrophotographic photosensitive member, it is preferable to use an extremely firm member as the insert. Then, for the purpose of forming the insert so as to be firm, there can be used metal materials high in elastic modulus and hardness such as iron-base alloys, stainless steels and tungsten. Moreover, the shape of the insert is commonly a solid columnar shape but not a hollow columnar shape, for the purpose of more effectively ensuring the strength of the insert.

CITATION LIST

Patent Literature

PTL 1: Japanese Patent Application Laid-Open No. 2001-066814
PTL 2: Japanese Patent Application Laid-Open No. 2004-288784
PTL 3: Japanese Patent Application Laid-Open No. 2007-233356

SUMMARY OF INVENTION

Technical Problem

Here is described a method in which an insert is made to pass through the interior of a cylindrical electrophotographic photosensitive member as a workpiece, force is applied to both end portions of the insert, and thus the surface of the electrophotographic photosensitive member is pressed against the surface (the surface having an uneven structure) of a molding member supported as described above. In this method, when for the insert made to pass through the interior of the cylindrical electrophotographic photosensitive member, such firm metal materials as described above are used, and the shape of the insert is designed to be columnar, then a stable pressure can be applied to the cylindrical electrophotographic photosensitive member.

Here is described a method for setting the aforementioned pressure in a mass production in which a large number of cylindrical electrophotographic photosensitive members are continuously processed. This pressure is eventually the strength of a force for pressing the surface of the cylindrical electrophotographic photosensitive member against the surface (the surface having an uneven structure) of the molding member, and accordingly, in an actual processing, the insert to be inserted into the interior of the cylindrical electrophotographic photosensitive member and the molding member are moved closer to each other with respect to the distance therebetween. Thus, in advance of the continuous processing, the conditions involving the distance are determined. Specifically, under the conditions that the insert is inserted into the interior of the cylindrical electrophotographic photosensitive member and the surface of the cylindrical electrophotographic photosensitive member is made to abut on the surface (the surface having an uneven structure) of the molding member, the distance between the molding member and the insert is adjusted in such a manner that the depth of the molding member transferred to the surface of the cylindrical electrophotographic photosensitive member comes to be an intended numerical value. In this way, an appropriate distance between the insert and the molding member at the time of pressurizing is beforehand determined and set in a processing apparatus to perform a continuous processing.

On the other hand, in a mass production in which the continuous processing of a large number of cylindrical electrophotographic photosensitive members is performed, the pressures applied to the individual cylindrical electrophotographic photosensitive members sometimes undergo variation due to the variation in the wall thickness of the individual cylindrical substrates. For example, when a cylindrical electrophotographic photosensitive member having a cylindrical substrate being larger in wall thickness than the other cylindrical substrates is processed, the pressure is increased, and consequently the depth of the uneven structure formed on the surface of the cylindrical electrophotographic photosensitive member sometimes comes to be deeper. Under the influence of such a variation of the wall thickness of the individual cylindrical electrophotographic photosensitive members, there is a possibility that the extent of the transfer of the surface structure (uneven structure) of the molding member to the surface of the individual electrophotographic photosensitive members undergoes a variation. More specifically, when a large number of workpieces are continuously processed, there occurs a problem such that the depth of the uneven structure formed on the surface of the cylindrical electrophotographic photosensitive members possibly undergoes the occurrence of the variation among the individual workpieces.

A case where the processing is performed, in contrast to the above-described case, by applying a method using an insert, the method being a conventional technique, is described. For the purpose of coping with the variation in the wall thickness of the individual cylindrical substrates, occurring in such a continuous processing wherein no reproducibility can be expected for the wall thickness, it is effective to provide the insert with a certain degree of flexibility. To what degree of flexibility (or firmness) the columnar insert is formed is mainly set on the basis of the selection of the materials for the insert. The properties to be considered herein include the elastic modulus and the hardness. The use of the materials for the insert, selected so as for these properties to be set at some lower values leads to the acquirement by the insert of the properties easily absorbing the wall thickness variation of the individual cylindrical substrates.

However, as described above, the insert is also required to be a firmer member for the purpose of generating the pressure due to the insert uniformly in the axial direction of the cylindrical electrophotographic photosensitive member without concentrating the pressure due to the insert on the end portions. In this connection, when the insert is formed by using a material having such a degree of flexibility that allows the absorption of the variation of the wall thickness of the individual cylindrical substrates, the concentration of the pressure at the end portions cannot be suppressed, and it is difficult to generate the pressure uniformly in the axial direction of the cylindrical electrophotographic photosensitive member. On the other hand, when the insert is formed by using a material sufficiently firm to allow the pressure to be generated uniformly in the axial direction of the cylindrical electrophotographic photosensitive member without concentrating the pressure on the end portions, it is impossible to absorb the variation of the wall thickness of the individual cylindrical substrates. In other words, in the hitherto known techniques, the material for the insert cannot be simultaneously provided with the aforementioned flexibility and strength.

The present invention has been made in order to solve the above-described problems. An object of the present invention is to provide a process capable of reducing the variation of the uneven structure of the individual work pieces even when a large number of cylindrical electrophotographic photosensitive members are continuously processed, in the case where the uneven structure is formed on the surface of the cylindrical electrophotographic photosensitive members as workpieces.

Solution to Problem

The present invention provides a process for forming an uneven structure on a surface of a cylindrical electrophotographic photosensitive member including a cylindrical substrate and a surface layer, the process including the steps of: (i) inserting an insert into the cylindrical substrate, and (ii) bringing into contact a molding member having on the surface thereof the surface structure corresponding to the uneven structure with the surface of the surface layer, and transferring the surface structure on the surface of the molding member to the surface of the surface layer, the insert including: a shaft part; an abutting part positioned outside of the shaft part in the radial direction, the abutting part having: the outer peripheral surface which contacts with the inner peripheral surface of the cylindrical substrate when the insert is inserted into the cylindrical substrate; and the inner peripheral surface facing the outer peripheral surface of the shaft part with a gap at both end portions thereof in the axial direction; and a connecting part connecting the abutting part and the shaft part, wherein, the step (ii) further includes: (a) applying force to both end portions of the shaft part in the axial direction, and bringing the surface of the surface layer into pressure contact with the surface of the molding member, so as to press the outer peripheral surface of the abutting part against the inner peripheral surface of the cylindrical substrate, while maintaining the gap in such a manner that the outer peripheral surface of the shaft part and the inner peripheral surface of the abutting part are not in contact with each other, or (b) supporting both end portions of the shaft part in the axial direction, and applying force to the molding member, and bringing the surface of the molding member into pressure contact with the surface of the surface layer, so as to press the inner peripheral surface of the cylindrical substrate against the outer peripheral surface of the abutting part, while maintaining the gap in such a manner that the outer peripheral surface of the shaft part and the inner peripheral surface of the abutting part are not in contact with each other.

Additionally, the present invention also provides a process for producing a cylindrical electrophotographic photosensitive member on the surface of the surface layer of which an uneven structure is formed by forming the uneven structure on the surface of the surface layer of the cylindrical electrophotographic photosensitive member with the above-described process.

Advantageous Effects of Invention

According to the present invention, even when a large number of cylindrical electrophotographic photosensitive members are continuously processed, in the case where an uneven structure is formed on the surface of the surface layer of each of the cylindrical electrophotographic photosensitive members as workpieces, the variation of the uneven structure of the individual workpieces can be reduced.

BRIEF DESCRIPTION OF DRAWINGS

FIG. 3 is a diagram illustrating a conventional process for forming an uneven structure on the surface of the surface layer of a cylindrical electrophotographic photosensitive member.

FIG. 4 is a diagram illustrating a process for forming an uneven structure on the surface of the surface layer of a cylindrical electrophotographic photosensitive member used in an Example.

FIGS. 5A, 5B and 5C are diagrams illustrating the surfaces (the surfaces each having an uneven structure) of the molding members used in Examples.

DESCRIPTION OF EMBODIMENTS

Hereinafter, a process for forming an uneven structure (hereinafter, also referred to as "the process for forming an uneven structure of the present invention") on the surface (the surface of a cylindrical electrophotographic photosensitive member) of the surface layer of a cylindrical electrophotographic photosensitive member of the present invention is described with reference to the accompanying drawings.

Figure 1A:
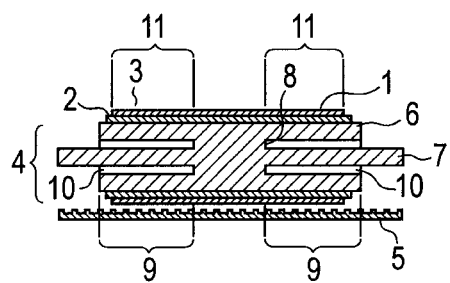
FIGS. 1A, 1B, 1C, 1D, 1E, 1F, 1G and 1H are diagrams illustrating an example of a process of the present invention for forming an uneven structure on the surface of the surface layer of a cylindrical electrophotographic photosensitive member.
Figure 1E:
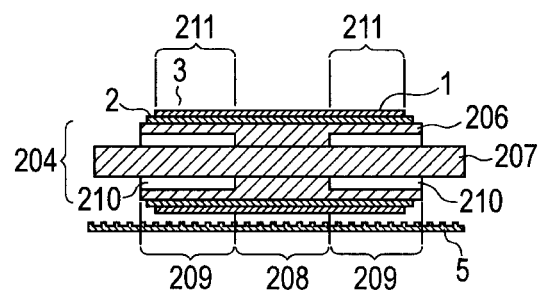
Figure 1B:
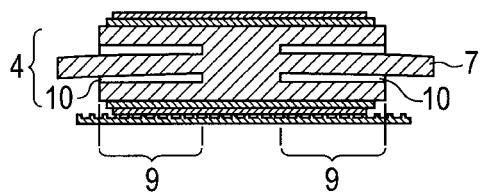

In FIGS. 1A and 1B, an insert 4 is a member (tool) inserted into the interior of the cylindrical substrate of a cylindrical electrophotographic photosensitive member 1. The insert 4 includes a shaft part 7, an abutting part 6, positioned outside of the shaft part in the radial direction, having an outer peripheral surface to be brought into contact with the inner peripheral surface of the cylindrical substrate 2 when the insert 4 is inserted into the cylindrical substrate, and a connecting part 8 connecting the shaft part 7 and the abutting part 6. The abutting part 6 has an inner peripheral surface, at each of both end portions thereof in the axial direction, facing with a gap 10 the outer peripheral surface of the shaft part 7. The connecting part 8 is positioned in the approximately central portion in the axial direction, with respect both to the abutting part 6 and to the shaft part 7. The shaft part 7 has an outer peripheral surface, at each of both end portions in the axial direction, facing the inner peripheral surface of the abutting part 6 with the gap 10.

The cylindrical electrophotographic photosensitive member 1 includes at least the surface layer 3 formed on the cylindrical substrate 2. Between the cylindrical substrate 2 and the surface layer 3, one or more other layers may be formed. A molding member 5 having on the surface thereof the surface structure (an uneven structure) corresponding to the above-described uneven structure is disposed in such a manner that the surface (the surface having an uneven structure) thereof faces the surface (the surface to be processed) of the cylindrical electrophotographic photosensitive member 1. The molding member 5 is preferably a firm member having a sufficient thickness and being hardly deformed. Alternatively, when the molding member 5 is a sheet-like and easily deformable member, the back side of the molding member 5 (the surface other than the surface having the uneven structure) may be supported with a plate-like supporting member (not shown). Such a plate-like supporting member is preferably a firm member hardly deformable, such as a member made of a metal. The molding member 5 may be designed to be heated with a heater.

In the present invention, so as for the shaft part 7 and the molding member 5 to be moved closer to each other, a force (pressure) falling within the range allowing the outer peripheral surface of the abutting part 6 and the inner peripheral surface of the cylindrical substrate 2 to be pressed against each other is applied to at least either both end portions of the shaft part 7 in the axial direction or the molding member 5. This force is a force applied for the purpose that the surface (the surface to be processed) of the surface layer 3 of the cylindrical electrophotographic photosensitive member 1 and the surface (the surface having an uneven structure) of the molding member 5 are pressed against each other (brought into pressure contact with each other), and the surface structure (the uneven structure) of the molding member 5 is transferred to the surface (the surface to be processed) of the surface layer 3 of the cylindrical electrophotographic photosensitive member 1. Accordingly, this force may be applied, for example, to both end portions of the shaft part 7 in the axial direction under the conditions that the molding member 5 is supported on and fixed to a plate-like supporting member, or conversely, this force may be applied to the molding member (through the supporting member) under the conditions that the shaft part 7 is fixed and the molding member 5 is supported on the supporting member. Or, alternatively, this force may be applied both to the shaft part 7 and to the molding member 5. Whether this force is applied to both end portions of the shaft part 7 in the axial direction, to the molding member 5 or to other positions does not cause any effect on the present invention, and hence for the convenience of description, the following description is made by mainly taking as an example the case where force is applied to both end portions of the shaft part 7 in the axial direction under the condition that the molding member 5 is fixed. FIG. 1A is a diagram illustrating the condition before the application of force to both end portions of the shaft part 7 in the axial direction, and FIG. 1B is a diagram illustrating the condition that force is applied to both end portions of the shaft part 7 in the axial direction. In FIG. 1B, the shaft part 7 is bent.

In the abutting part 6, there are non-abutting portions, as the portions from the positions corresponding to the ends of the connecting part 8 in the axial direction to the ends of the abutting part 6 in the axial direction, not brought into contact with the shaft part 7 even under the condition that force is applied to both end portions of the shaft part 7 in the axial direction as described above. Such portions are the portions of the abutting part 6, to be specified by the position and length of the connecting part 8. Hereinafter, the portions of the abutting part 6, from the positions corresponding to the ends of the connecting part 8 in the axial direction to the ends of the abutting part 6 in the axial direction, are also referred to as the portions 9 for the convenience of description.

In the insert 4, first, force is applied to both end portions of the shaft part 7 in the axial direction, and the shaft part 7 transmits the force to the connecting part 8. Next, the force transmitted to the connecting part 8 is transmitted to the portions 9 of the abutting part 6 in a dispersed manner. Consequently, the force applied to both end portions of the shaft part 7 in the axial direction is uniformly transmitted to the whole of the abutting part 6. When the force is applied to the both end portions of the shaft part 7 in the axial direction, the portions 9 are not brought into contact with the shaft part 7, and hence the gap 10 is maintained between each of the portions 9 and the shaft part 7 while the force is being applied to both end portions of the shaft part 7 in the axial direction. The outer diameter of the shaft part 7 is set in such a manner that when force is applied to both end portions of the shaft part 7 in the axial direction, the outer peripheral surface of the shaft part 7 and the inner peripheral surface of the portion 9 of the abutting part 6 are not brought into contact with each other.

When a large number of cylindrical electrophotographic photosensitive members are processed, the following two requirements are to be fulfilled for the purpose of preventing the variation of the wall thickness of the cylindrical substrates of the individual cylindrical electrophotographic photosensitive members from affecting the processing results.

The first requirement is such that the insert should transmit the applied pressure to the cylindrical electrophotographic photosensitive member while absorbing the variation of the wall thickness of the individual cylindrical substrates, and the insert should have a certain degree of flexibility. The second requirement is such that the applied pressure should be maintained uniform in the axial direction of the cylindrical electrophotographic photosensitive member.

At the beginning, the first requirement is described. According to the process for forming an uneven structure of the present invention, the insert 4 is provided with the gaps 10, and hence the shaft part 7 can be elastically bent. The elastic bending of the shaft part 7 enables the insert 4 to apply a pressure to the cylindrical electrophotographic photosensitive member 1 under the condition that the variation of the wall thickness of the cylindrical substrates 2 of the individual cylindrical electrophotographic photosensitive members 1 is allowed. For example, in the course of processing a large number of cylindrical electrophotographic photosensitive members, when a cylindrical electrophotographic photosensitive member having the wall thickness of the cylindrical substrate larger than a predetermined value, the shaft part 7 is accordingly bent so as to prevent the pressure from becoming higher.

Next, the second requirement is described. The insert 4 used in the process for forming an uneven structure of the present invention has the gaps 10 between the abutting part 6 and the shaft part 7, the force applied to both end portions of the shaft part 7 in the axial direction is transmitted to the position of the connecting part 8 but not the end portions of the abutting part 6. More specifically, the force concerned is transmitted to the positions of the connecting part 8, most nearest to the end portions of the abutting part 6. From the positions to which the force is transmitted to the positions corresponding at least to the ends of the coated region of the surface layer 3 of the cylindrical electrophotographic photosensitive member 1 in the axial direction, the portions 9 are present. The portions 9 do not directly receive the transmission of the force from shaft part 7 due to the gaps 10, and hence the force transmitted from the shaft part 7 to the above-described positions can be effectively dispersed. Accordingly, the abutting part 6 used in the process for forming an uneven structure of the present invention can alleviate the concentration of the pressure applied to the cylindrical electrophotographic photosensitive member 1 at specific positions.

The gaps 10 are provided for the purpose of enabling the elastic bending of the shaft part 7, and is not necessarily to be spaces. For example, even when a member sufficiently smaller in elastic modulus and hardness than the materials for the shaft part 7 and the abutting part 6, such as a member made of a resin, a rubber or a sponge, is placed in the gaps 10, as long as the elastic bending of the shaft part 7 is possible, the advantageous effects of the present invention can be obtained. The placement of a member sufficiently small in elastic modulus and hardness than the materials for the shaft part 7 and the abutting part 6 in the gaps 10 can be expected to provide effects including suppression of unwanted invasion of dust and the like. Further, for the purpose of enabling the elastic bending of the shaft part 7, the dimensions of the gaps 10 in the abutting part 6 in the axial direction and the radial direction are appropriately set in ranges allowing the advantageous effects to be maintained, in consideration of the strength of the above-described force and the like. Accordingly, such shapes of the gaps 10 as extremely smaller in relation to the length of the abutting part 6 in the axial direction (for example, less than 1% of the length concerned) are not appropriate to the gaps 10.

In the present invention, when the length of the abutting part in the axial direction, corresponding to the coated region of the surface layer of the electrophotographic photosensitive member is represented by L, and the length from the position corresponding to the end of the connecting part of the abutting part in the axial direction to the position corresponding to the end of the coated region of the surface layer of the electrophotographic photosensitive member is represented by Ls, L and Ls preferably satisfy the following relation (Mathematical Expression 1):

$$0.20L \leq Ls \leq 0.49L \quad \text{(Mathematical Expression 1)}$$

By taking FIG. 1A as an example, Ls is the length in the abutting part 6 from the position corresponding to the end of the connecting part 8 to the position corresponding to the end of the coated region of the surface layer 3, and Ls is the Ls interval 11. The units for L and Ls used in the following description and the mathematical expressions are [mm]. By setting Ls so as to fall within the above-described range (Mathematical Expression 1), the effect to alleviate the applied pressure variation due to the variation of the wall thickness of the individual cylindrical substrates 2 by elastically bending the shaft part 7 can be obtained at a higher degree.

Here, the setting range of Ls is described. As described above, in the absorption of the variation of the wall thickness of the individual cylindrical substrates 2 by elastically bending the shaft part 7, as the length of the connecting part 8 in the axial direction is decreased, the shaft part 7 comes to be more easily bent in a flexible manner. This is because in the abutting part 6, when Ls is longer, the shaft part 7 can be more elastically bent. Accordingly, with the increase of Ls, a high effect is obtained. With respect to this, the present inventors have verified this effect experimentally in the range of Ls from 0.20L to 0.49L.

In the present invention, the force falling within the range allowing the outer peripheral surface of the abutting member and the inner peripheral surface of the cylindrical substrate to be pressed against each other is represented by M [N], the longitudinal elastic modulus of the material of the abutting part is represented by E [N/mm$^2$], and cross-sectional second moment of the abutting member from the position corresponding to the end of the connecting part of the abutting member in the axial direction to the position corresponding to the end of the coated region of the surface layer of the electrophotographic photosensitive member is represented by Is [mm$^4$], Fs [mm] defined by the following Mathematical Expression 3 preferably satisfies the following Mathematical Expression 2:

$$3.9 \times 10^{-4} \leq Fs \leq 3.1 \times 10^{-1} \quad \text{(Mathematical Expression 2)}$$

$$Fs = M \cdot Ls^3 / 3 \cdot E \cdot Is \quad \text{(Mathematical Expression 3)}$$

The force M [N] is applied to at least either both end portions of the shaft part 7 in the axial direction or the molding member 5, so as for the shaft part 7 and the molding member 5 to be moved closer to each other, as a force falling within the range allowing the outer peripheral surface of the abutting part 6 and the inner peripheral surface of the cylindrical substrate 2 to be pressed against each other. The longitudinal elastic modulus is a proportionality constant between the force applied to the material and the longitudinal distortion caused in the action direction of the force; the proportionality constant exhibits a certain value for each of the materials. In the above-described Mathematical Expression 3, the material is the material for the abutting part 6, the force is the force M [N] transmitted from the shaft part 7, and the action direction is the direction perpendicular to the cylindrical axis of the abutting part 6. The cross-sectional second moment varies depending on the cross-sectional shape in the action direction to show the degree of resistance against the longitudinal distortion, and does not change depending on the material of the member.

The following Mathematical Expression 4 is the calculation expression of the average cross-sectional second moment Is [mm⁴] in above-described Mathematical Expression 3; for example, in the case of FIG. 1A, the Ls interval 11 is defined as the calculation object position. The Ls interval 11, as described above, means the interval in the abutting part 6 from the position corresponding to the end of the connecting part 8 to the position corresponding to the end of the coated region of the surface layer 3 of the cylindrical electrophotographic photosensitive member 1, and has the distance Ls [mm]:

$$Is = \pi(d1^4 - ds2^4)/64 \quad \text{(Mathematical Expression 4)}$$

In Mathematical Expression 4, d1 [mm] is the outer diameter in the calculation object position, and ds2 [mm] is the minimum inner diameter in the Ls interval 11.

Mathematical Expression 3 for calculating Fs [mm] to be calculated with the force in the Ls interval 11 is the heretofore known general formula for calculation of the bending magnitude of a straight beam freely deformable in the space, and the calculated numerical value is originally a distance [mm]. However, the present invention is a process taking as the object thereof the pressing of the molding member 5 against the surface layer 3 of the cylindrical electrophotographic photosensitive member 1, and hence in the actual processing, the distance corresponding to the calculated result is not created in the abutting part 6. Thus, what Fs [mm] means is the difference between the pressures at the following two positions generated so as for the abutting part 6 to press the inner peripheral surface of the cylindrical substrate 2 toward the molding member 5.

The first position is the position nearest to the end of the abutting part 6 of the positions of the abutting part 6 in the axial direction corresponding to the end of the connecting part 8. As described above, this position is the portion where the force applied to both end portions of the shaft part 7 in the axial direction is transmitted to the abutting part 6. The second position is the position of the abutting part 6 corresponding the end of the coated region of the surface layer 3 of cylindrical electrophotographic photosensitive member 1 in the axial direction. The force applied to both end portions of the shaft part 7 in the axial direction is transmitted to the first position in the abutting part 6, and then transmitted toward the second position in a dispersed manner while bending is being generated. Accordingly, in the portion 9, the distribution of the pressure generated so as for the abutting part 6 to press the inner peripheral surface of the cylindrical substrate 2 toward the molding member 5 falls in a range having a distribution such that the pressure is the strongest at the first position and the weakest at the second position. The width of the distribution of the pressure corresponds to the numerical value of Fs [mm] derived from the above-described force in the Ls interval 11, indicating the difference in the portion 9 between the portion where the above-described pressure is the strongest and the portion where the above-described pressure is the weakest.

Here, the setting range of the Fs [mm] in Mathematical Expression 2 is described.

As described above, Fs [mm] indicates the difference in the portion 9 between the portion where the above-described pressure is the strongest and the portion where the above-described pressure is the weakest, and hence this range being narrow is preferable because such a narrow range makes high the uniformity of the depth of the uneven structure formed on the surface of the surface layer of the cylindrical electrophotographic photosensitive member. When the high uniformity of the depth of the uneven structure is secured, the shaft part 7 can be more elastically bent. The present inventors performed an experiment focusing on this point, and has verified that in the setting of the portion 9 of the abutting part 6, by setting Fs [mm] defined by Mathematical Expression 3 described above so as to satisfy Mathematical Expression 2, the pressure applied by the abutting part 6 to the cylindrical electrophotographic photosensitive member 1 is maintained constant, and the uniformity of the depth of the uneven structure is made high.

As described above, the constancy of the depth of the uneven structure formed on the surface of the surface layer of the cylindrical electrophotographic photosensitive member is determined by the numerical value of Fs [mm]. Accordingly, even in a case where a plurality of processings different with respect to the cross-sectional shape and the material of the portion 9 of the abutting part 6 and the force M [N] are performed, when the numerical values of Fs [mm] in such processings are the same as each other, such processings can equally obtain the constancy of the uneven structure formed on the surface of the surface layer of the cylindrical electrophotographic photosensitive member. Consequently, even in a case where for the purpose of processing a plurality of cylindrical electrophotographic photosensitive members different in inner diameter from each other, processing is performed with a plurality of inserts different in outer diameter from each other and a plurality of the values of the force M [N], when the processing is performed with the value of Fs [mm] set to be constant, the same constancy can be obtained.

Additionally, the effect of the difference (variation) in the wall thickness of the cylindrical substrates used for the cylindrical electrophotographic photosensitive members is described by taking as an example an aluminum cylindrical substrate having an outer diameter of 30 mm. Commonly used aluminum cylindrical substrates having an outer diameter of 30 mm is classified into two types each having a wall thickness of 0.75 mm or 1.0 mm; the wall thickness difference between these two types is 0.25 mm, and hence the effect of the wall thickness difference on Fs [mm] is extremely small. In consideration of the productivity, the outer diameter of the abutting part 6 is required to be set slightly smaller the inner diameter of the cylindrical substrate, for the purpose of making smooth the insertion of the insert into the interior of the cylindrical electrophotographic photosensitive member (namely, the interior of the cylindrical substrate). Thus, when the abutting part 6 and the cylindrical substrate are both subjected to the force M [N], the abutting part 6 and the cylindrical substrate are bent with accompanying slippage. Accordingly, with respect to the aspect of strength, the cylindrical substrate does not function so as to be subjected to the force in an integrated manner with the abutting part 6. From these facts, the effect of the difference of the wall thickness between the cylindrical substrates on Fs [mm] can be said to be extremely small.

Next, ds2 [mm] in Mathematical Expression 4 is described. When the abutting part 6 maintains uniform the pressure applied to the cylindrical electrophotographic photosensitive member 1, the cross-sectional shape of the abutting part 6 in the Ls interval 11 is not required to be the same at all the positions. The inner diameter of the abutting part 6 in the Ls interval 11 is preferably equal to or larger than the inner diameter of the abutting part 6 at the end of the connecting part 8 in the axial direction, and is preferably equal to or smaller than the inner diameter at the position corresponding to the end of the coated region of the surface layer 3.

Figure 2A:
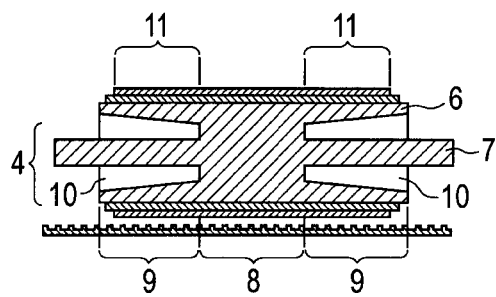
FIGS. 2A, 2B, 2C, 2D, 2E, 2F, 2G, 2H, 2I, 2J, 2K and 2L are diagrams illustrating another example of the process of the present invention for forming an uneven structure on the surface of the surface layer of a cylindrical electrophotographic photosensitive member.
Figure 2E:
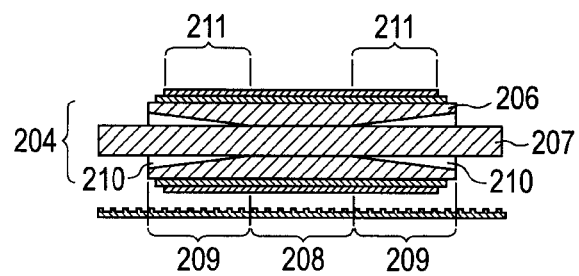
Figure 2B:
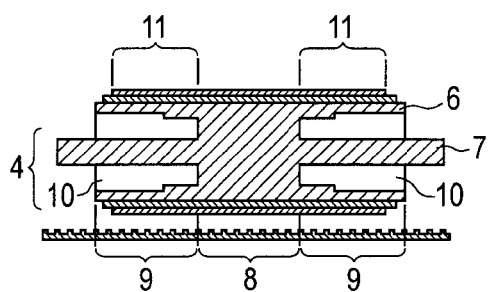

For example, as shown in FIG. 2A, the shape of the inner periphery of the abutting part 6 in the Ls interval 11 may be such that the inner diameter is continuously increased over a range from the position corresponding to the end of the connecting part 8 to the position corresponding to the end of the coated region of the surface layer 3. Alternatively, as shown in FIG. 2B, the shape of the inner periphery of the abutting part 6 in the Ls interval 11 may also be such that the inner diameter is increased in a stepwise manner with a plurality of steps provided. The shape of the abutting part 6 as shown in FIG. 2B or FIG. 2A is capable of suppressing the Fs [mm] to be smaller while the gap 10 is being maintained, and is preferable for the purpose of maintaining constant the applied pressure. As described above, Fs [mm] is preferably smaller for the purpose of maintaining constant the pressure applied by the abutting part 6 to the cylindrical electrophotographic photosensitive member 1. Accordingly, when the gap with the shaft part 7 is maintained in the portion 9 of the abutting part 6, the condition that the inner diameter of the abutting part 6 in the Ls interval 11 is smaller is preferable because such a condition functions in the direction of reducing Fs [mm]. Also, from these situations, when an abutting part 6 varying in the cross-sectional shape thereof depending on the positions in the Ls interval 11 is used, it is preferable to use for ds2 [mm] the smallest value in the Ls interval 11.

Also, in the connecting part 8, the bending similar to that in the Ls interval 11 occurs, and in the connecting part 8, the above-described distribution of the pressure (pressure strength distribution) occurs in every position in the connecting part 8. However, the range of this distribution is smaller than the range of the distribution of the pressure generated in the Ls interval 11, when the Ls interval 11 is formed so as to satisfy all of Mathematical Expression 1 to Mathematical Expression 3. This is because in the abutting part 6, the end of the portion 9 in which the Ls interval is located is open, but the position corresponding to the end of the connecting part 8 is continued to the portion 9 to be augmented in strength, and hence the bending magnitude of the connecting part 8 is made smaller than the bending magnitude in the Ls interval 11. Accordingly, in the abutting part 6 of the present invention, it is the Ls interval 11 that should be predominantly considered with respect to the pressure distribution.

A process, as another embodiment of the present invention, for forming an uneven structure on the surface of the surface layer of a cylindrical electrophotographic photosensitive member is described with reference to FIG. 1C. An insert 104 is a member including a columnar or cylindrical shaft member 107 and an abutting member 106, and is used as inserted into the cylindrical electrophotographic photosensitive member 1. On the outer periphery of the shaft member 107, a central portion 108 having an outer diameter approximately the same as the inner diameter of the abutting member 106 is provided in the central portion in the axial direction, and smaller diameter portions being smaller in outer diameter than the central portion 108 are provided.

Figure 1F:
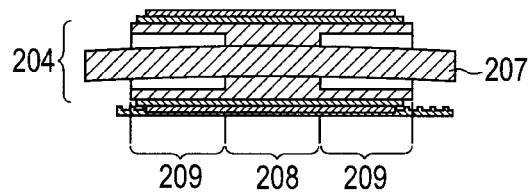
Figure 1C:
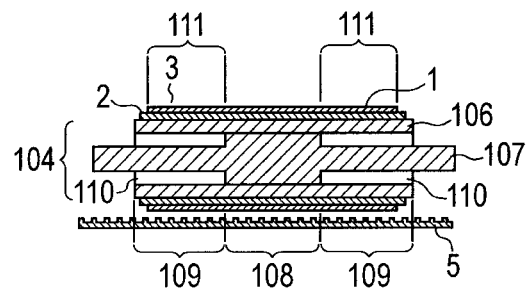

In the embodiment shown in FIG. 1C, so as for the shaft member 107 and the molding member 5 to be moved closer to each other, a force falling within the range allowing the outer peripheral surface of the abutting member 106 and the inner peripheral surface of the cylindrical substrate 2 to be pressed against each other is applied to at least either both end portions of the shaft member 107 in the axial direction or the molding member 5. This force is a force applied for the purpose that the surface of the surface layer 3 of the cylindrical electrophotographic photosensitive member 1 and the surface of the molding member 5 are pressed against each other, and the surface structure (an uneven structure) of the molding member 5 is transferred to the surface of the surface layer 3 of the cylindrical electrophotographic photosensitive member 1. Accordingly, this force may be applied, for example, to both end portions of the shaft member 107 in the axial direction under the conditions that the molding member 5 is supported on the fixed plate-like supporting member, or conversely, this force may be applied to the molding member 5 (through the supporting member) under the conditions that the shaft member 107 is fixed and the molding member 5 is supported on the supporting member. Or, alternatively, this force may be applied both to both end portions of the shaft member 107 in the axial direction and to the molding member 5. Whether this force is applied to both end portions of the shaft member 107 in the axial direction, to the molding member 5 or to other positions does not cause any effect on the present invention. Accordingly, for the convenience of description, the following description on the embodiment shown in FIG. 1C is made by taking as an example the case where the force is applied to both end portions of the shaft member 107 in the axial direction under the condition that the molding member 5 is fixed and supported.

The abutting member 106 has the non-abutting portions, as the portions from the positions corresponding to the ends of the central portion 108 in the axial direction to the ends of the abutting member 106 in the axial direction, not brought into contact with the shaft member 107 even under the condition that the force is applied to both end portions of the shaft member 107 in the axial direction as described above. Such portions are the portions of the abutting member 106, to be specified by the position and length of the central portion 108. Hereinafter, the portions of the abutting member 106, from the positions corresponding to the ends of the central portion 108 in the axial direction to the ends of the abutting member 106 in the axial direction, are also referred to the portions 109 for the convenience of description.

In the insert 104, the force is applied to both end portions of the shaft member 107 in the axial direction, and the shaft member 107 transmits the force from the central portion 108 of the shaft member 107 to the abutting member 106 in a dispersed manner. Consequently, the force applied to both end portions of the shaft member 107 in the axial direction is transmitted to the whole of the abutting member 106. When the smaller diameter portions are provided at positions nearer to the ends than the central portion 108 in the axial direction of the shaft member 107, the smaller diameter portions are not brought into contact with the abutting member 106, and hence the gap 110 is maintained between each of the smaller diameter portions and the abutting member 106. The outer diameter of the central portion 108 of the shaft member 107 is approximately the same as the inner diameter of the abutting member 106, this means that the outer diameter of the central portion 108 of the shaft member 107 is made slightly smaller than the inner diameter of the abutting member 106 for the purpose of making the shaft member 107 pass through the abutting member 106, and there is no gap 110 between the outer peripheral surface of the central portion 108 of the shaft member 107 and the inner peripheral surface of the abutting member 106. The outer diameter of the smaller diameter portions of the shaft member 107 is set in such a manner that when force is applied to both end portions of the shaft member 107 in the axial direction, the outer peripheral surface of the smaller diameter portions of the shaft member 107 and the inner peripheral surface of the abutting member 106 are not brought into contact with each other. Accordingly, even when the outer diameter of the central portion 108 of the shaft member 107 is smaller than the inner diameter of the abutting member 106, the advantageous effects of the present invention can be obtained.

Figure 1G:
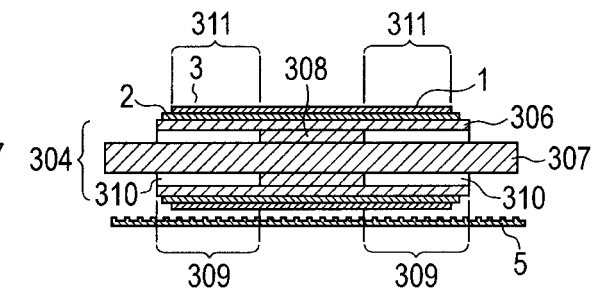
Figure 1D:
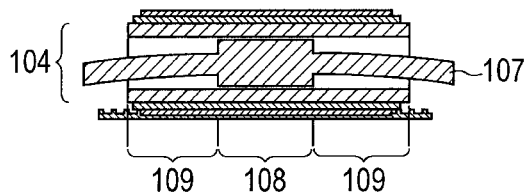

FIG. 1C is a diagram illustrating the condition before force is applied to both end portions of the shaft member 107 in the axial direction, and FIG. 1D is a diagram illustrating the condition when force is applied to both end portions of the shaft member 107 in the axial direction. In FIG. 1D, the shaft member 107 is bent.

Even when the abutting member 106 and the shaft member 107 are formed integrally with each other, the advantageous effects of the present invention can also be obtained. Specifically, in the embodiment shown in FIG. 1C, the abutting member 106 has the same function and effect as the function and effect of the abutting part 6 shown in FIG. 1A. In the embodiment shown in FIG. 1C, the smaller diameter portions of the shaft member 107 have the same function and effect as the function and effect of the shaft part 7 shown in FIG. 1A. In the embodiment shown in FIG. 1C, the Ls interval 111 has the same function and effect as the function and effect of the Ls interval 11 shown in FIG. 1A.

Accordingly, the process for forming an uneven structure on the surface of the surface layer of the cylindrical electrophotographic photosensitive member of the embodiment shown in FIG. 1C has the advantageous effects of the present invention in the same manner as the above-described embodiment shown in FIG. 1A.

Figure 2F:
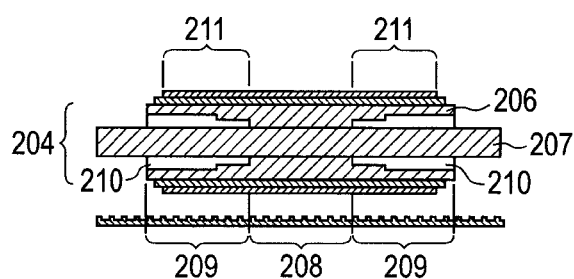
Figure 2C:
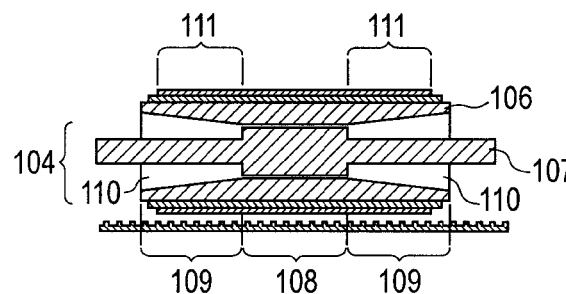
Figure 2G:
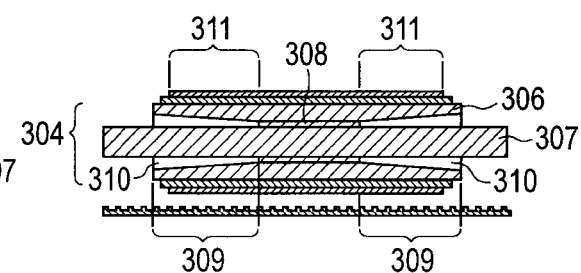
Figure 2D:
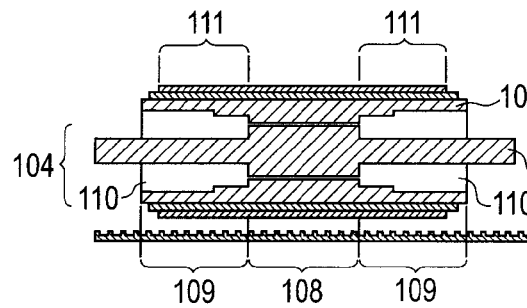

When the abutting member 106 maintains uniform the pressure applied to the cylindrical electrophotographic photosensitive member 1, the cross-sectional shape of the abutting member 106 in the Ls interval 111 is not required to be the same at all the positions. The inner diameter of the abutting member 106 in the Ls interval 111 is preferably equal to or larger than the inner diameter of the abutting member 106 at the end of the central portion 108 of the shaft member 107 in the axial direction, and is preferably equal to or smaller than the inner diameter at the position corresponding to the end of the coated region of the surface layer 3. For example, as shown in FIG. 2C, the shape of the inner periphery of the abutting member 106 in the Ls interval 111 may be such that the inner diameter is continuously increased over a range from the position corresponding to the end of the central portion 108 of the shaft member 107 to the position corresponding to the end of the coated region of the surface layer 3. Alternatively, as shown in FIG. 2D, the shape of the inner periphery of the abutting member 106 in the Ls interval 111 may also be such that the inner diameter is increased in a stepwise manner with a plurality of steps provided.

Figure 2H:
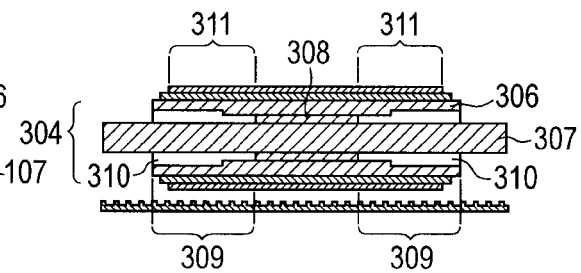
Figure 2I:
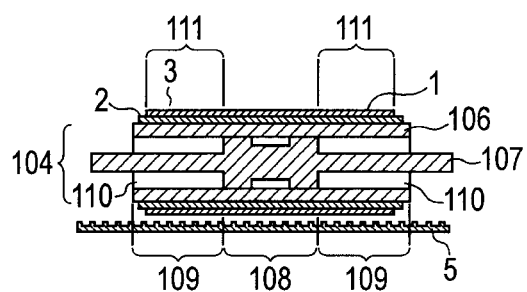

The outer diameter of the central portion 108 is not required to be constant at all the positions; for example, as shown in FIG. 2I, even when a portion having a smaller outer diameter is provided in a portion of the central portion 108 near to the center in the axial direction, the advantageous effects of the present invention can be obtained. Such a portion, namely, a portion interposed between the portions having a larger diameter, on both end sides of the central portion 108 in the axial direction, is not located at a position nearer to the end of the abutting member 106 in the axial direction than the central portion 108, and hence such a portion is not included in the smaller diameter portions in the embodiment shown in FIG. 1C.

A process, as yet another embodiment of the present invention, for forming an uneven structure on the surface of the surface layer of a cylindrical electrophotographic photosensitive member is described with reference to FIG. 1E. In FIG. 1E, an insert 204 is a member including a columnar or cylindrical shaft member 207 and an abutting member 206, and is used as inserted into the interior of the cylindrical electrophotographic photosensitive member 1. The abutting member 206 is provided with a central portion 208 in the axial direction (hereinafter, also simply referred to as the "central portion") in the central portion of the abutting member 206 in the axial direction having an inner diameter approximately the same as the outer diameter of the shaft member 207 and expanded portions 209 having a larger inner diameter at a position nearer to the end portion than the central portion 208.

In the embodiment shown in FIG. 1E, so as for the shaft member 207 and the molding member 5 to be moved closer to each other, a force falling within the range allowing the outer peripheral surface of the abutting member 206 and the inner peripheral surface of the cylindrical substrate 2 to be pressed against each other is applied to at least either both end portions of the shaft member 207 in the axial direction or the molding member 5. This force is a force applied for the purpose that the surface (the surface to be processed) of the surface layer 3 of the cylindrical electrophotographic photosensitive member 1 and the surface (the surface having an uneven structure) of the molding member 5 are pressed against each other, and the surface structure (an uneven structure) of the molding member 5 is transferred to the surface (the surface to be processed) of the surface layer 3 of the cylindrical electrophotographic photosensitive member 1. Accordingly, this force may be applied, for example, to both end portions of the shaft member 207 in the axial direction under the conditions that the molding member 5 is supported and fixed on a plate-like supporting member, or conversely, this force may be applied to the molding member 5 (through the supporting member) under the conditions that the shaft member 207 is fixed and the molding member 5 is supported on the supporting member. Or, alternatively, this force may be applied both to both end portions of the shaft member 207 in the axial direction and to the molding member 5. Whether this force is applied to both end portions of the shaft member 207 in the axial direction, to the molding member 5 or to other positions does not cause any effect on the present invention. Accordingly, for the convenience of description, the following description is made by taking as an example the case where the force is applied to both end portions of the shaft member 207 in the axial direction under the condition that the molding member 5 is fixed.

In the insert 204, first, force is applied to both end portions of the shaft member 207 in the axial direction, and the shaft member 207 transmits the force to the central portion 208 of the abutting member 206. Next, the force transmitted to the central portion 208 is transmitted to the expanded portions 209 in a dispersed manner. Consequently, the force applied to both end portions of the shaft member 207 in the axial direction is uniformly transmitted to the whole of the abutting part 206. When the force is applied to the both end portions of the shaft member 207 in the axial direction, the expanded portions 209 are not brought into contact with the shaft member 207, and hence the gap 210 is maintained between each of the expanded portions 209 and the shaft member 207 while the force is being applied to both end portions of the shaft member 207 in the axial direction. The inner diameter of the central portion 208 is approximately the same as the outer diameter of the shaft member 207, this means that the outer diameter of the shaft member 207 is made slightly smaller than the inner diameter of the central portion 208 of the abutting member 206 for the purpose of making the shaft member 207 pass through the abutting member 206, and there is no gap 210 between the outer peripheral surface of the shaft member 207 and the inner peripheral surface of the central portion 208. The outer diameter of the shaft member 207 is set in such a manner that when force is applied to both end portions of the shaft member 207 in the axial direction, the outer peripheral surface of the shaft member 207 and the inner peripheral surface of the expanded portions 209 of the abutting member 206 are not brought into contact with each other. Accordingly, even when the outer diameter of the shaft member 207 is smaller than the inner diameter of the central portion 208, the advantageous effects of the present invention can be obtained.

FIG. 1E is a diagram illustrating the condition before force is applied to both end portions of the shaft member 207 in the axial direction, and FIG. 1F is a diagram illustrating the condition when force is applied to both end portions of the shaft member 207 in the axial direction. In FIG. 1F, the shaft member 207 is bent.

Even when the abutting member 206 and the shaft member 207 are formed integrally with each other, the advantageous effects of the present invention can also be obtained. Specifically, in the embodiment shown in FIG. 1E, the abutting member 206 has the same function and effect as the function and effect of the abutting part 6 shown in FIG. 1A. In the embodiment shown in FIG. 1E, the smaller diameter portions 209 of the shaft member 207 have the same function and effect as the function and effect of the shaft part 7 shown in FIG. 1A. In the embodiment shown in FIG. 1E, the central portion 208 of the shaft member 207 has the same function and effect as the connecting part 8 shown in FIG. 1A. In the embodiment shown in FIG. 1E, the Ls interval 211 has the same function and effect as the function and effect of the Ls interval 11 shown in FIG. 1A.

Accordingly, the process for forming an uneven structure on the surface of the surface layer of the cylindrical electrophotographic photosensitive member of the embodiment shown in FIG. 1E has the advantageous effects of the present invention in the same manner as the above-described embodiment shown in FIG. 1A.

When the abutting member 206 maintains uniform the pressure applied to the cylindrical electrophotographic photosensitive member 1, the cross-sectional shape of the abutting member 206 in the Ls interval 211 is not required to be the same at all the positions. The inner diameter of the abutting member 206 in the Ls interval 211 is preferably equal to or larger than the inner diameter of the end portions of the central portion 208, and is preferably equal to or smaller than the inner diameter at the position corresponding to the end of the coated region of the surface layer 3. For example, as shown in FIG. 2E, the shape of the inner periphery of the abutting member 206 in the Ls interval 211 may be such that the inner diameter is continuously increased over a range from the end of the central portion 208 to the position corresponding to the end of the coated region of the surface layer 3. Alternatively, as shown in FIG. 2F, the shape of the inner periphery of the abutting member 206 in the Ls interval 211 may also be such that the inner diameter is increased in a stepwise manner with a plurality of steps provided.

Figure 2K:
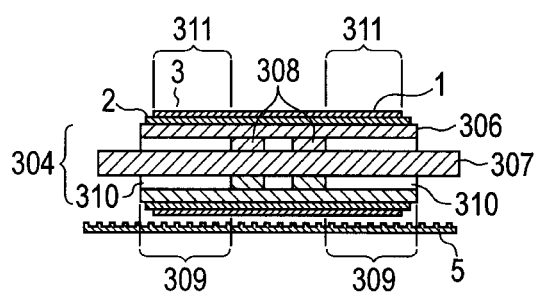
Figure 2J:
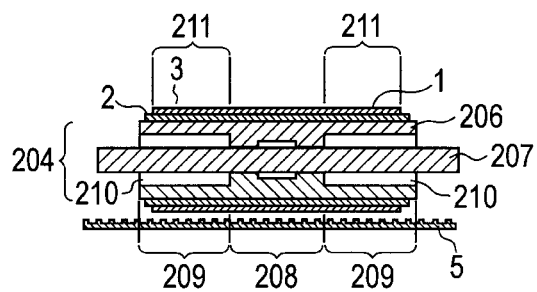

The inner diameter of the central portion 208 is not required to be constant at all the positions; for example, as shown in FIG. 2J, even when a portion having a larger inner diameter is provided in a portion of the central portion 208 near to the center in the axial direction, the advantageous effects of the present invention can be obtained. Such a portion, namely, a portion interposed between the portions on both sides thereof having a smaller inner diameter, of the central portion 208 in the axial direction, is not located at a position nearer to the end portion (the end portion of the abutting member 206 in the axial direction) than the central portion 208, and hence such a portion is not included in the expanded portions 209 in the embodiment shown in FIG. 1E.

A process, as still yet another embodiment of the present invention, for forming an uneven structure on the surface of the surface layer of a cylindrical electrophotographic photosensitive member is described with reference to FIG. 1G. In FIG. 1G, an insert 304 is a member including a columnar or cylindrical shaft member 307, an abutting member 306 and a connecting member 308, and is used as inserted into the interior of the cylindrical electrophotographic photosensitive member 1.

In the embodiment shown in FIG. 1G, so as for the shaft member 307 and the molding member 5 to be moved closer to each other, a force falling within the range allowing the outer peripheral surface of the abutting member 306 and the inner peripheral surface of the cylindrical substrate 2 to be pressed against each other is applied to at least either both end portions of the shaft member 307 in the axial direction or the molding member 5. This force is a force applied for the purpose that the surface (the surface to be processed) of the surface layer 3 of the cylindrical electrophotographic photosensitive member 1 and the surface (the surface having an uneven structure) of the molding member 5 are pressed against each other, and the surface structure (an uneven structure) of the molding member 5 is transferred to the surface (the surface to be processed) of the surface layer 3 of the cylindrical electrophotographic photosensitive member 1. Accordingly, this force may be applied, for example, to both end portions of the shaft member 307 in the axial direction under the conditions that the molding member 5 is supported and fixed on a plate-like supporting member, or conversely, this force may be applied to the molding member 5 (through the supporting member) under the conditions that the shaft member 307 is fixed and the molding member 5 is supported on the supporting member. Or, alternatively, this force may be applied both to both end portions of the shaft member 307 in the axial direction and to the molding member 5. Whether this force is applied to both end portions of the shaft member 207 in the axial direction, to the molding member 5 or to other positions does not cause any effect on the present invention. Accordingly, for the convenience of description, the following description is made by taking as an example the case where the force is applied to both end portions of the shaft member 307 in the axial direction under the condition that the molding member 5 is fixed.

Approximately at the center of the abutting member 306 in the axial direction, the connecting member 308 is provided under the condition that the shaft member 307 is made to pass through the connecting member 308. The inner peripheral surface of the connecting member 308 abuts on the outer peripheral surface of the shaft member 307, and the outer peripheral surface of the connecting member 308 abuts on the inner peripheral surface of the abutting member 306. The abutting member 306 has the non-abutting portions, as the portions from the positions corresponding to the ends of the connecting member 308 in the axial direction to the ends of the abutting member 306 in the axial direction, not brought into contact with the shaft member 307 even under the condition that the force is applied to both end portions of the shaft member 307 in the axial direction as described above. Such portions are the portions of the abutting member 306, to be specified by the position and length of the connecting member 308. Hereinafter, the portions of the abutting member 306, from the positions corresponding to the ends of the connecting member 308 in the axial direction to the ends of the abutting member 306 in the axial direction, are referred to the portions 309 for the convenience of description.

In the insert 304, first, force is applied to both end portions of the shaft member 307 in the axial direction, and the shaft member 307 transmits the force to the connecting member 308. Next, the force transmitted to the connecting member 308 is transmitted to the portions 309 of the abutting member 306 in a dispersed manner. Consequently, the force applied to both end portions of the shaft member 307 in the axial direction is uniformly transmitted to the whole of the abutting part 306. When the force is applied to the both end portions of the shaft member 307 in the axial direction, the portions 309 are not brought into contact with the shaft member 307, and hence the gap 310 is maintained between each of the portions 309 and the shaft member 307 while the force is being applied to both end portions of the shaft member 307 in the axial direction. The inner diameter of the connecting member 308 is approximately the same as the outer diameter of the shaft member 307, this means that the outer diameter of the shaft member 307 is made slightly smaller than the inner diameter of the connecting member 308 for the purpose of making the shaft member 307 pass through the connecting member 308, and there is no gap 310 between the outer peripheral surface of the shaft member 307 and the inner peripheral surface of the connecting member 308. The outer diameter of the shaft member 307 is set in such a manner that when force is applied to both end portions of the shaft member 307 in the axial direction, the outer peripheral surface of the shaft member 307 and the inner peripheral surface of the portions 309 of the abutting member 306 are not brought into contact with each other. Even when the outer diameter of the shaft member 307 is only slightly smaller than the inner diameter of the connecting member 308, the advantageous effects of the present invention can be obtained.

Figure 1H:
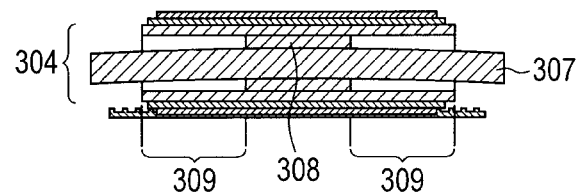

FIG. 1G is a diagram illustrating the condition before force is applied to both end portions of the shaft member 307 in the axial direction, and FIG. 1H is a diagram illustrating the condition when force is applied to both end portions of the shaft member 307 in the axial direction. In FIG. 1H, the shaft member 307 is bent.

Even when the abutting member 306 and the shaft member 307 are formed integrally with each other, the advantageous effects of the present invention can also be obtained. Specifically, in the embodiment shown in FIG. 1G, the abutting member 306 has the same function and effect as the function and effect of the abutting part 6 shown in FIG. 1A. In the embodiment shown in FIG. 1G, the shaft member 307 has the same function and effect as the function and effect of the shaft part 7 shown in FIG. 1A. In the embodiment shown in FIG. 1G, the Ls interval 311 has the same function and effect as the function and effect of the Ls interval 11 shown in FIG. 1A.

Accordingly, the process for forming an uneven structure on the surface of the surface layer of the cylindrical electrophotographic photosensitive member of the embodiment shown in FIG. 1G has the advantageous effects of the present invention in the same manner as the above-described embodiment shown in FIG. 1A.

When the abutting member 306 maintains uniform the pressure applied to the cylindrical electrophotographic photosensitive member 1, the cross-sectional shape of the abutting member 306 in the Ls interval 311 is not required to be the same at all the positions. The inner diameter of the abutting member 306 in the Ls interval 311 is preferably equal to or larger than the outer diameter of connecting member 308, and is preferably equal to or smaller than the inner diameter at the position corresponding to the end portion of the coated region of the surface layer 3. For example, as shown in FIG. 2G, the shape of the inner periphery of the abutting member 306 in the Ls interval 311 may be such that the inner diameter is continuously increased over a range from the position corresponding to the end of the connecting member 308 to the position corresponding to the end of the coated region of the surface layer 3. Alternatively, as shown in FIG. 2H, the shape of the inner periphery of the abutting member 306 in the Ls interval 311 may also be such that the inner diameter is increased in a stepwise manner with a plurality of steps provided.

Figure 2L:
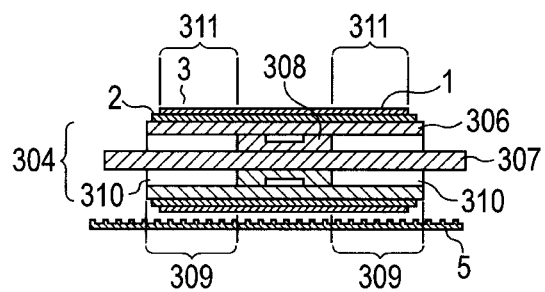

Two or more connecting members 308 may also be adopted. For example, as shown in FIG. 2K, even when two or more connecting members 308 are used, and space portions are prepared and maintained in the portions near to the center in the axial direction, the advantageous effects of the present invention can also be obtained. As shown in FIG. 2L, even when a portion having a smaller outer diameter is provided in a portion near to the center of the connecting member 308 in the axial direction, the advantageous effects of the present invention can also be obtained. Such portions, namely, the portions sandwiched by two or more connecting members 308 or the portions sandwiched by the portions larger in outer diameter on the sides of both ends of the connecting member 308 in the axial direction are not located nearer to the end portions (the end portions of the abutting member 306 in the axial direction) than the connecting portion(s), and hence such portions are not included in the portion 309 in the embodiment shown in FIG. 1G.

EXAMPLES

Hereinafter, the present invention is described in more detail with reference to specific examples. Here, it is to be noted that "parts" in Examples mean "parts by mass."

(Production of Cylindrical Electrophotographic Photosensitive Member)

An aluminum alloy (A6063) cylinder having an outer diameter of 30.5 mm, a length of 370.0 mm and a wall thickness of 1 mm was used as the cylindrical substrate. Next, 60 parts of barium sulfate particles having a coating layer of tin oxide (trade name: Pastran PC1, manufactured by Mitsui Mining & Smelting Co., Ltd.), 15 parts of titanium oxide particles (trade name: TITANIX JR, manufactured by Tayca Corp.), 43 parts of a resol-type phenolic resin (trade name: Phenolite J-325, manufactured by Dainippon Ink and Chemicals Inc., solid content: 70%), 0.015 part of a silicone oil (trade name: SH28PA, manufactured by Dow Corning Toray Silicone Co., Ltd.), 3.6 parts of a silicone resin (trade name: Tospal 120, manufactured by Toshiba Silicone Co., Ltd.), 50 parts of 2-methoxy-1-propanol and 50 parts of methanol were placed in a ball mill, and subjected to a dispersion treatment for 20 hours to prepare a coating liquid for a conductive layer. The cylindrical substrate was dip coated with the coating liquid for a conductive layer, and the obtained coating film was thermally cured at 140° C. for 1 hour to form a 15-μm thick conductive layer.

Next, 10 parts of a copolymerized nylon (trade name: Amilan CM 8000, manufactured by Toray Industries, Inc.) and 30 parts of methoxymethylated nylon 6 (Ttrade name: Toresine EF-30T, manufactured by Teikoku Chemical Industry Co., Ltd.) were dissolved in a mixed solvent composed of 400 parts of methanol and 200 parts of n-butanol to prepare a coating liquid for an undercoating layer (intermediate layer). The conductive layer was dip coated with the coating liquid for an undercoating layer, and the obtained coating film was dried at 100° C. for 30 minutes to form a 0.45-μm thick undercoating layer (intermediate layer).

Next, 20 parts of a hydroxy gallium phthalocyanine crystal (a charge generating material) with a crystal form having strong peaks at Bragg angles (2θ±0.2°) of CuKα characteristic X-ray diffraction of 7.3° and 28.1° and 0.2 part of a calixarene represented by the following structural formula (1), Ltd.) were dissolved in a mixed solvent composed of 600 parts of monochlorobenzene and 200 parts of methylal to prepare a coating liquid for a charge transport layer. The charge generating layer is dip coated with the coating liquid for a charge transport layer, and the resulting coating film was dried at 100° C. for 30 minutes to form a 15-μm thick charge transport layer. In this dip coating, the uncoated width of the coating upper end was set at 1.5 mm. After the dip coating, before the drying of the coating film, the coating lower end was peeled off from the end of the cylindrical substrate in a width of 1.5 mm with a fluororubber blade.

Next, 0.5 part of a fluorine atom-containing resin (trade name: GF-300, manufactured by Toagosei Co., Ltd.) as a dispersant for a lubricant was dissolved in a mixed solvent composed of 30 parts of 1,1,2,2,3,3,4-heptafluorocyclopentanone (trade name: Zeorola H, manufactured by Zeon Corp.) and 30 parts of 1-propanol, and then 10 parts of polytetrafluoroethylene particles (trade name: Rubron L-2, manufactured by Daikin Industries, Ltd.) as a lubricant was added to the resulting solution, and the resulting mixture of these was

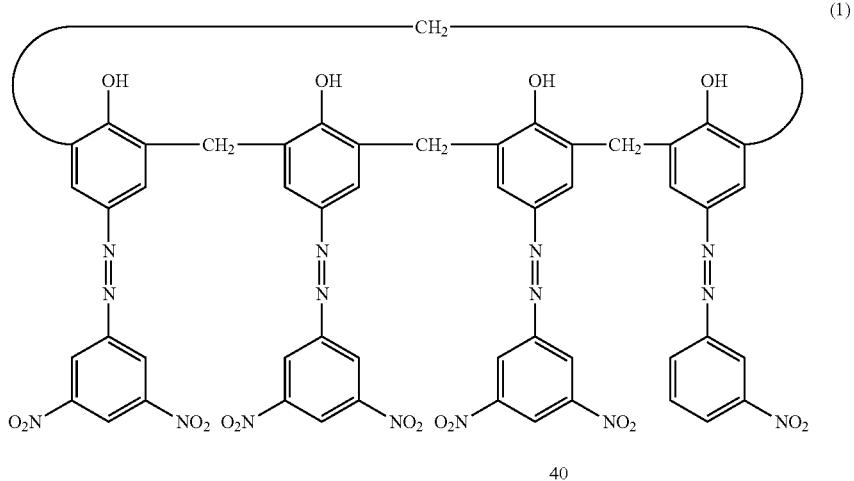

(1)

10 parts of polyvinyl butyral (trade name: Eslex BX-1, manufactured by Sekisui Chemical Co., Ltd.) and 600 parts of cyclohexanone were placed in a sand mill using glass beads of 1 mm in diameter to be subjected to a dispersion treatment for 4 hours, and 700 parts of ethyl acetate was added to the resulting mixture to prepare a coating liquid for a charge generating layer. The undercoating layer was dip coated with the coating liquid for a charge generating layer, and the resulting coating film was dried at 80° C. for 15 minutes to form a 0.17-μm thick charge generating layer.

Next, 70 parts of a compound (a charge transport material (a positive hole transporting compound)) represented by the following structural formula (2)

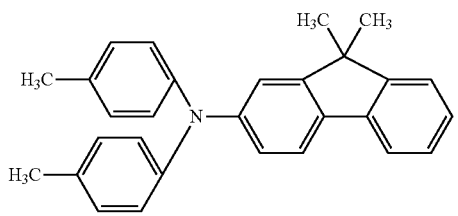

(2)

and 100 parts of a polycarbonate resin (trade name: Eupiron 2400, manufactured by Mitsubishi Engineering Plastics Co., placed in a high pressure dispersing machine (trade name: Microfluidizer M-110EH, manufactured by Microfluidizer Co., U.S.) and subjected to a dispersion treatment at a pressure of 600 kgf/cm². The resulting dispersion mixture was filtered with a polyflon filter (trade name: PF-040, manufactured by Advantec Toyo Kaisha, Ltd.) to yield a lubricant dispersion. Then, to the resulting lubricant dispersion, 90 parts of a compound (a positive hole transporting compound) represented by the following structural formula (3),

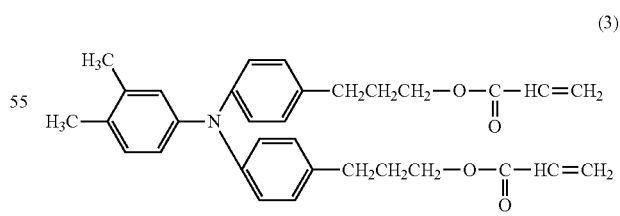

(3)

60 parts of 1,1,2,2,3,3,4-heptafluorocyclopentanone and 60 parts of 1-propanol were added, and the resulting mixture was filtered with a polyflon filter (trade name: PF-020, manufactured by Advantec Toyo Kaisha, Ltd.) to prepare a coating liquid for a protective layer.

The charge transport layer was coated with the coating liquid for a protective layer. In this dip coating, the uncoated width of the coating upper end was set at 1.5 mm. After the dip coating, before the drying of the coating film, the coating lower end was peeled off from the end of the cylindrical substrate in a width of 1.5 mm with a fluororubber blade.

Then, the resulting coating film was dried in the air at 50° C. for 10 minutes. Subsequently, the coating film was irradiated with an electron beam for 1.6 seconds in nitrogen while the cylindrical substrate was being rotated at 200 rpm, under the conditions that the accelerating voltage was 150 kV and the beam current was 3.0 mA. and successively the curing reaction of the coating film was performed in nitrogen while the temperature of the coating film was being increased from 25° C. to 125° C. over a period of 30 seconds. In this case, the absorbed dose of the electron beam was measured to be 15 kGy. The oxygen concentration in the atmosphere of the electron beam irradiation and the thermal curing reaction was 15 ppm or less. Then, the cylindrical substrate was naturally cooled in the air until the temperature of the coating film reached 25° C. Subsequently, the coating film was heat treated at 100° C. for 30 minutes in the air to form a 5-μm thick protective layer.

In this way, there was produced a cylindrical electrophotographic photosensitive member (a cylindrical electrophotographic photosensitive member before an uneven structure was formed on the surface of the surface layer (protective layer)) having a surface layer which was a protective layer.

With the above-described process, a total number of 1000 of cylindrical electrophotographic photosensitive members were produced.

Example 1

Into the thus obtained cylindrical electrophotographic photosensitive member, an insert as shown in FIG. 1A was inserted. In this insertion, the insertion was performed in such a manner that the central position of the cylindrical electrophotographic photosensitive member 1 in the axial direction and the central position of the abutting part 6 in the axial direction coincided with each other. As the material for the insert, a cast iron having a longitudinal elastic modulus E of $100 \times 10^3$ N/mm² was used. The length in the axial direction and the outer diameter of the abutting part 6 were set at 372.0 mm and Φ28.3 mm, respectively. The outer diameter and the total length of the shaft part 7 were set at 10.0 mm and 440 mm, respectively. The inner diameter of the inner peripheral surface of the portion 9 of the abutting part 6 was set at Φ26.3 mm. Ls, the distance from the end of the connecting part 8 of the shaft part 7 in the axial direction to the end of the coated region of the surface layer 3 of the cylindrical electrophotographic photosensitive member 1 was set at 36.7 mm. The cross-sectional second moment Is in the Ls interval 111 of the abutting part 6 was calculated to be $8.0 \times 10^3$ mm⁴.

The supporting member 13 shown in FIG. 4 has a frame body made of a material of SUS304 and a heater for heating disposed inside thereof, and was disposed so as for the upper surface thereof to be approximately horizontal. A 50-μm thick mold made of a nickel material, having columnar shapes as shown in FIGS. 5A to 5C, was used as the molding member 5, and the diameter Y, the height Z and the pitch X of the column were set at 5 μm, 2 μm and 7.5 μm, respectively. The molding member 5 was fixed on the upper surface of the supporting member 13. Under this condition, the temperature of the heater was increased so as for the surface of the molding member 5 to reach a temperature of 120° C.

For the purpose of pressing the surface of the cylindrical electrophotographic photosensitive member 1 to the molding member 5 by moving the abutting part 6 closer to the molding member 5, a loading mechanism not shown in the figure was provided on each of both end portions of the shaft part 7. The loading mechanism is provided with a guide rail and a ball screw in the vertical direction, and further with a connection supporting member vertically movable in connection with the ball screw and the guide rail. The ball screw was connected to a stepping motor to be rotated and to vertically move the connection supporting member along the guide rail. The guide rail along which the connection supporting member vertically moves, the ball screw and the shaft part 7 were all designed to be supported with reference to one and the same frame.

The connection supporting member and the end of the shaft part 7 were connected with a ball joint. The ball joint and the connection supporting member were designed to be connected through a load cell, so as to enable the monitoring of the load magnitude pressing the shaft part 7 against the molding member 5.

In performing the processing, first the stepping motor was made to rotate and the shaft part 7 was pressed toward the molding member 5 until the monitoring value of the load cell reached 2000 N, and the rotation magnitude of the stepping motor at this time was recorded. Next, by moving the supporting member 13 from the right hand side to the left hand side of FIG. 4, the cylindrical electrophotographic photosensitive member 1 was rotated clockwise as shown in the figure, and thus the processing surface of the molding member 5 was made to continuously abut on the outer peripheral surface of the cylindrical electrophotographic photosensitive member 1.

In the same manner, all the produced cylindrical electrophotographic photosensitive members were processed, and thus there were obtained a total number of 1000 of cylindrical electrophotographic photosensitive members each having an uneven structure formed on the surface thereof. For each of the second and later cylindrical electrophotographic photosensitive members, the rotation magnitude of the stepping motor was set to be the same as the rotation magnitude recorded at the time of the processing of the first cylindrical electrophotographic photosensitive member. In the processing of all the cylindrical electrophotographic photosensitive members, the outer peripheral surface of the shaft part 7 was never brought into contact with the inner peripheral surface of the abutting part 6.

Example 2

The uneven structure of the molding member 5 was transferred to the whole region of the surface of the cylindrical electrophotographic photosensitive member 1 in the same manner as in Example 1 except that the same insert as used in Example 1 was used in such a manner that when the abutting part 6 of the insert was moved closer to the molding member 5, the apparatus structure as shown in FIG. 4 was used for the purpose of pressing the surface of the cylindrical electrophotographic photosensitive member 1 against the molding member 5.

In Example 10, for the purpose of pressing the cylindrical electrophotographic photosensitive member 1 against the molding member 5 by moving the abutting part 6 closer to the molding member 5, the supporting member 13 was provided with a not-shown loading mechanism. The loading mechanism is provided with a guide rail and a ball screw in the vertical direction, and further with a connection supporting member vertically movable in connection with the ball screw and the guide rail. The ball screw was connected to a stepping motor to be rotated and to vertically move the connection supporting member along the guide rail. The guide rail along which the connection supporting member vertically moves, the ball screw and the shaft part 7 were all designed to be supported with reference to one and the same frame. The frame and the end portion of the shaft part 7 were connected with a ball joint. The supporting member 13 and the frame were designed to be connected through a load cell, so as to enable the monitoring of the load magnitude pressing the molding member 5 against the shaft part 7.

In performing the processing, first the stepping motor was made to rotate and the molding member 5 was pressed toward the shaft part 7 until the monitoring value of the load cell reached 2000 N, and the rotation magnitude of the stepping motor at this time was recorded. Next, by moving the supporting member 13 from the right hand side to the left hand side of FIG. 4, the cylindrical electrophotographic photosensitive member 1 was rotated clockwise as shown in the figure, and thus the processing surface of the molding member 5 was made to continuously abut on the outer peripheral surface of the cylindrical electrophotographic photosensitive member 1.

In the same manner, all the produced cylindrical electrophotographic photosensitive members were processed, and thus there were obtained a total number of 1000 of cylindrical electrophotographic photosensitive members each having an uneven structure formed on the surface thereof. For each of the second and later cylindrical electrophotographic photosensitive members, the rotation magnitude of the stepping motor was set to be the same as the rotation magnitude recorded at the time of the processing of the first cylindrical electrophotographic photosensitive member. In the processing of all the cylindrical electrophotographic photosensitive members, the outer peripheral surface of the shaft part 7 was never brought into contact with the inner peripheral surface of the abutting part 6.

Example 101

Into the cylindrical electrophotographic photosensitive member obtained in the same manner as in Example 1, inserted was an insert 104, as shown in FIG. 1C, including a columnar shaft member 107 having a central portion 108 and smaller diameter portions, and a columnar abutting member 106 made to pass through the shaft member 107. In this insertion, the insertion was performed in such a manner that the central position of the cylindrical electrophotographic photosensitive member 1 in the axial direction and the central position of the abutting member 106 in the axial direction coincided with each other. The abutting member 106 was prepared by using as the material therefor a cast iron having a longitudinal elastic modulus E of $100 \times 10^3$ N/mm², and the shaft member 107 was prepared by using, as the material therefor, a sintered steel having a longitudinal elastic modulus E of $540 \times 10^3$ N/mm². The length in the axial direction and the outer diameter of the abutting member 106 were set at 372.0 mm and Φ28.3 mm, respectively. The outer diameter of the central portion 108 of the shaft member 107, the outer diameter of the smaller diameter portions of the shaft member 107 and the total length of the shaft member were set at Φ26.2 mm, 10.0 mm and 440 mm, respectively. The inner diameter of the abutting member 106 was set at Φ26.3 mm. Ls, the distance from the end of the central portion 108 of the shaft member 107 in the axial direction to the end of the coated region of the surface layer 3 of the cylindrical electrophotographic photosensitive member 1 was set at 36.7 mm. The cross-sectional second moment Is in the Ls interval 111 of the abutting member 106 was calculated to be $8.0 \times 10^3$ mm⁴.

The supporting member 13 shown in FIG. 4 has a frame body made of a material of SUS304 and a heater for heating disposed inside thereof, and was disposed so as for the upper surface thereof to be approximately horizontal. A 50-μm thick mold made of a nickel material, having columnar shapes as shown in FIGS. 5A to 5C, was used as the molding member 5, and the diameter Y, the height Z and the pitch X of the column were set at 5 μm, 2 μm and 7.5 μm, respectively. The molding member 5 was fixed on the upper surface of the supporting member 13. Under this condition, the temperature of the heater was increased so as for the surface of the molding member 5 to reach a temperature of 120° C.

For the purpose of pressing the surface of the cylindrical electrophotographic photosensitive member 1 to the molding member 5 by moving the abutting member 106 closer to the molding member 5, a loading mechanism not shown in the figure was provided on each of both end portions of the shaft member 107. The loading mechanism is provided with a guide rail and a ball screw in the vertical direction, and further with a connection supporting member vertically movable in connection with the ball screw and the guide rail. The ball screw was connected to a stepping motor to be rotated and to vertically move the connection supporting member along the guide rail. The guide rail along which the connection supporting member vertically moves, the ball screw and the shaft member 107 were all designed to be supported with reference to one and the same frame. The connection supporting member and the end of the shaft member 107 were connected with a ball joint. The ball joint and the connection supporting member were designed to be connected through a load cell, so as to enable the monitoring of the load magnitude pressing the shaft member 107 against the molding member 5.

In performing the processing, first the stepping motor was made to rotate and the shaft member 107 was pressed toward the molding member 5 until the monitoring value of the load cell reached 2000 N, and the rotation magnitude of the stepping motor at this time was recorded. Next, by moving the supporting member 13 from the right hand side to the left hand side of FIG. 4, the cylindrical electrophotographic photosensitive member 1 was rotated clockwise as shown in the figure, and thus the processing surface of the molding member 5 was made to continuously abut on the outer peripheral surface of the cylindrical electrophotographic photosensitive member 1.

In the same manner, all the produced cylindrical electrophotographic photosensitive members were processed, and thus there were obtained a total number of 1000 of cylindrical electrophotographic photosensitive members each having an uneven structure formed on the surface thereof. For each of the second and later cylindrical electrophotographic photosensitive members, the rotation magnitude of the stepping motor was set to be the same as the rotation magnitude recorded at the time of the processing of the first cylindrical electrophotographic photosensitive member. In the processing of all the cylindrical electrophotographic photosensitive members, the outer peripheral surface of the shaft member 107 was never brought into contact with the inner peripheral surface of the abutting member 106.

In Table 1, Ls is the distance from the end of the central portion 108 of the shaft member 107 in the axial direction to the end of the coated region of the surface layer 3 of the cylindrical electrophotographic photosensitive member 1; the shaft diameter is the outer diameter of the smaller diameter portions of the shaft member; the inner diameter is the inner diameter of the abutting member 106; Is is the cross-sectional second moment of the abutting member 106 in the Ls interval 111; M is the monitored value of the load cell at the time of processing; E is the longitudinal elastic modulus of the material for the abutting member 106; and Fs is the pressure difference in the Ls interval 111. In Table 1, the longitudinal elastic modulus E of $100 \times 10^3$ N/mm² means that a cast iron was used as the material for the abutting member 106; the longitudinal elastic modulus E of $204 \times 10^3$ N/mm² means that SUS440 was used as the material for the abutting member 106; and the longitudinal elastic modulus E of $540 \times 10^3$ N/mm² means that a sintered steel was used as the material for the abutting member 106.

Examples 102 to 142

In the same manner as in Example 101, in each of Examples 102 to 142, 1000 cylindrical electrophotographic photosensitive members (the cylindrical electrophotographic photosensitive members before the uneven structure was formed on the surface of the surface layer (protective layer)) were produced.

Next, under the same conditions as in Example 101 except that the conditions shown in Table 1 were adopted, in each of Examples 102 to 142, the 1000 cylindrical electrophotographic photosensitive members were subjected to a surface processing, and thus 1000 cylindrical electrophotographic photosensitive members each having an uneven structure formed on the surface of the surface layer (protective layer) were produced. The shaft member 107 was used by adjusting the outer diameter of the smaller diameter portions of the shaft member 107 in such a manner that when the shaft member 107 was pressed toward the molding member 5 at the time of processing, at the time point where monitored value of the load cell reached the M value shown in Table 1, a gap was able to be maintained between the end portions of the abutting member 106 and the shaft member 107. In each of Examples 102 to 142, the material used for the shaft member 107 was the same as the material for the shaft member 107 in Example 101.

Examples 143 to 151

In each of Examples 143 to 151, 1000 cylindrical electrophotographic photosensitive members (the cylindrical electrophotographic photosensitive members before the uneven structure was formed on the surface of the surface layer (protective layer)) were produced in the same manner as in Example 101 except that an aluminum alloy (A6063) cylinder having an outer diameter of 24.0 mm, a length of 263.0 mm and a wall thickness of 0.75 mm was used as the cylindrical substrate.

Next, the conditions shown in Table 1 were adopted, and an abutting member 106 having an outer diameter of 22.3 mm and a length of 265.0 mm was used.

The shaft member 107 was used by adjusting the outer diameter of the smaller diameter portions of the shaft member 107 in such a manner that when the shaft member 107 was pressed toward the molding member 5 at the time of processing, at the time point where monitored value of the load cell reached the M value shown in Table 1, a gap was able to be maintained between the end portions of the abutting member 106 and the shaft member 107. In each of Examples 143 to 151, the material used for the shaft member 107 was the same as the material for the shaft member 107 in Example 101. In each of Examples 143 to 151, otherwise under the same conditions as in Example 101, the 1000 cylindrical electrophotographic photosensitive members were subjected to a surface processing, and thus 1000 cylindrical electrophotographic photosensitive members each having an uneven structure formed on the surface of the surface layer (protective layer) were produced.

The insert used in each of Examples 101 to 151 had a structure composed of two or more members as compared to the insert used in Example 1, and accordingly, was able to be produced at a lower load of production than the insert used in Example 1.

(Evaluation)

In each of the 1000 cylindrical electrophotographic photosensitive members (the cylindrical electrophotographic photosensitive members before the uneven structure was formed on the surface of the surface layer (protective layer)) obtained in each of Examples 101 to 151, the uneven structure was checked at three positions in total, namely, one position in the central portion in the axial direction and two positions each 20 mm away, toward the center, from one of both ends. In the evaluation, first, the depths of all the recessed portions in a 100-μm square area were measured at each of these three positions, and an average value was obtained at each of these three positions. From the thus obtained 3000 average (1000 photosensitive members×3 positions/photosensitive member) values in total, an average value was derived and defined as the total average. Next, with respect to the average value at each of the three positions in each of the 1000 processed cylindrical electrophotographic photosensitive members, the cylindrical electrophotographic photosensitive member including even one position 10% or more shallower than the total average value or 10% or more deeper than the total average value was evaluated as NG; in each of Examples 101 to 151, the number (NG number) of the cylindrical electrophotographic photosensitive members evaluated as NG was determined.

TABLE 1

| Example No. | Ls [mm] | Shaft diameter [mm] | Inner diameter [mm] | Is $[10^3 \text{ mm}^4]$ | M [N] | E $[10^3 \text{ N/mm}^2]$ | Fs $[10^{-4} \text{ mm}]$ | NG number |
|---|---|---|---|---|---|---|---|---|
| 101 | 66.1 | 10 | 26.9 | 5.8 | 2000 | 100 | 3323.33 | 14 |
| 102 | 36.7 | 5 | 6.3 | 31.4 | 50 | 100 | 2.62 | 9 |
| 103 | 66.1 | 10 | 27.3 | 4.2 | 3000 | 204 | 3348.83 | 13 |
| 104 | 36.7 | 10 | 25.9 | 9.4 | 35 | 204 | 3.01 | 10 |
| 105 | 69.7 | 10 | 27.7 | 2.6 | 4000 | 540 | 3236.77 | 11 |
| 106 | 36.7 | 10 | 26.3 | 8.0 | 50 | 540 | 1.91 | 8 |
| 107 | 73.4 | 10 | 26.3 | 8.0 | 2000 | 100 | 3295.18 | 6 |
| 108 | 128.5 | 10 | 26.3 | 8.0 | 400 | 100 | 3532.02 | 6 |
| 109 | 128.5 | 10 | 26.3 | 8.0 | 800 | 204 | 3462.77 | 7 |
| 110 | 128.5 | 10 | 26.3 | 8.0 | 2300 | 540 | 3760.95 | 6 |
| 111 | 179.8 | 10 | 26.3 | 8.0 | 150 | 100 | 3634.45 | 5 |
| 112 | 179.8 | 10 | 26.3 | 8.0 | 300 | 204 | 3563.19 | 5 |
| 113 | 179.8 | 10 | 26.3 | 8.0 | 800 | 540 | 3589.58 | 5 |

TABLE 1-continued

| Example No. | Ls [mm] | Shaft diameter [mm] | Inner diameter [mm] | Is [$10^3$ mm$^4$] | M [N] | E [$10^3$ N/mm$^2$] | Fs [$10^{-4}$ mm] | NG number |
|---|---|---|---|---|---|---|---|---|
| 114 | 73.4 | 5 | 6.3 | 31.4 | 50 | 100 | 20.98 | 2 |
| 115 | 73.4 | 5 | 6.3 | 31.4 | 50 | 204 | 10.29 | 0 |
| 116 | 73.4 | 5 | 6.3 | 31.4 | 50 | 540 | 3.89 | 0 |
| 117 | 73.4 | 10 | 22.3 | 19.3 | 1900 | 100 | 1294.57 | 2 |
| 118 | 73.4 | 10 | 22.3 | 19.3 | 1500 | 204 | 501.00 | 2 |
| 119 | 73.4 | 10 | 22.3 | 19.3 | 1500 | 540 | 189.27 | 0 |
| 120 | 73.4 | 10 | 26.3 | 8.0 | 1900 | 100 | 3130.42 | 2 |
| 121 | 73.4 | 10 | 26.3 | 8.0 | 1500 | 204 | 1211.46 | 2 |
| 122 | 73.4 | 10 | 26.3 | 8.0 | 1500 | 540 | 457.66 | 1 |
| 123 | 73.4 | 10 | 26.3 | 8.0 | 3000 | 204 | 2422.93 | 2 |
| 124 | 73.4 | 10 | 26.3 | 8.0 | 3000 | 540 | 915.33 | 2 |
| 125 | 128.5 | 6 | 8.3 | 31.3 | 50 | 100 | 113.02 | 0 |
| 126 | 128.5 | 6 | 8.3 | 31.3 | 50 | 204 | 55.40 | 1 |
| 127 | 128.5 | 6 | 8.3 | 31.3 | 50 | 540 | 20.93 | 1 |
| 128 | 128.5 | 12 | 22.3 | 19.3 | 350 | 100 | 1278.07 | 0 |
| 129 | 128.5 | 12 | 22.3 | 19.3 | 720 | 204 | 1288.81 | 0 |
| 130 | 128.5 | 12 | 22.3 | 19.3 | 1900 | 540 | 1284.83 | 0 |
| 131 | 128.5 | 10 | 26.3 | 8.0 | 350 | 100 | 3090.52 | 2 |
| 132 | 128.5 | 10 | 26.3 | 8.0 | 720 | 204 | 3116.49 | 2 |
| 133 | 128.5 | 10 | 26.3 | 8.0 | 1900 | 540 | 3106.87 | 1 |
| 134 | 179.8 | 9 | 10.3 | 30.9 | 50 | 100 | 313.34 | 0 |
| 135 | 179.8 | 9 | 10.3 | 30.9 | 50 | 204 | 153.60 | 1 |
| 136 | 179.8 | 9 | 10.3 | 30.9 | 50 | 540 | 58.03 | 0 |
| 137 | 179.8 | 12 | 22.3 | 19.3 | 130 | 100 | 1302.61 | 0 |
| 138 | 179.8 | 12 | 22.3 | 19.3 | 260 | 204 | 1277.07 | 0 |
| 139 | 179.8 | 12 | 22.3 | 19.3 | 700 | 540 | 1298.90 | 1 |
| 140 | 179.8 | 10 | 26.3 | 8.0 | 125 | 100 | 3028.71 | 2 |
| 141 | 179.8 | 10 | 26.3 | 8.0 | 260 | 204 | 3088.10 | 2 |
| 142 | 179.8 | 10 | 26.3 | 8.0 | 700 | 540 | 3140.89 | 2 |
| 143 | 49.4 | 10 | 19.9 | 2.4 | 2000 | 100 | 3335.65 | 12 |
| 144 | 127.4 | 10 | 20.9 | 4.4 | 200 | 100 | 3104.12 | 4 |
| 145 | 52.0 | 5 | 21.1 | 2.8 | 1800 | 100 | 3042.28 | 5 |
| 146 | 49.4 | 10 | 19.9 | 2.0 | 3400 | 204 | 3290.74 | 11 |
| 147 | 127.4 | 10 | 20.9 | 4.4 | 400 | 204 | 3043.26 | 3 |
| 148 | 52.0 | 8 | 21.3 | 2.8 | 3000 | 204 | 2485.52 | 4 |
| 149 | 78.0 | 10 | 20.9 | 3.8 | 3000 | 540 | 2310.72 | 4 |
| 150 | 127.4 | 10 | 20.9 | 2.8 | 660 | 540 | 3037.91 | 1 |
| 151 | 52.0 | 8 | 20.3 | 2.8 | 3000 | 540 | 938.97 | 4 |

Example 152

The uneven structure of the molding member 5 was transferred to the whole region of the surface of the cylindrical electrophotographic photosensitive member 1 in the same manner as in Example 101 except that the same insert 104 as used in Example 101 was used in such a manner that when the abutting member 106 of the insert 104 was moved closer to the molding member 5, the apparatus structure as shown in FIG. 4 was used for the purpose of pressing the surface of the cylindrical electrophotographic photosensitive member 1 against the molding member 5.

In Example 152, for the purpose of pressing the cylindrical electrophotographic photosensitive member 1 against the molding member 5 by moving the abutting member 106 closer to the molding member 5, the supporting member 13 was provided with a not-shown loading mechanism. The loading mechanism is provided with a guide rail and a ball screw in the vertical direction, and further with a connection supporting member vertically movable in connection with the ball screw and the guide rail. The ball screw was connected to a stepping motor to be rotated and to vertically move the connection supporting member along the guide rail. The guide rail along which the connection supporting member vertically moves, the ball screw and the shaft member 107 were all designed to be supported with reference to one and the same frame. The frame and each of the end portions of the shaft member 107 were connected with a ball joint. The supporting member 13 and the frame were designed to be connected through a load cell, so as to enable the monitoring of the load magnitude pressing the molding member 5 against the shaft member 107.

In performing the processing, first the stepping motor was made to rotate and the molding member 5 was pressed toward the shaft member 107 until the monitoring value of the load cell reached 2000 N, and the rotation magnitude of the stepping motor at this time was recorded. Next, by moving the supporting member 13 from the right hand side to the left hand side of FIG. 4, the cylindrical electrophotographic photosensitive member 1 was rotated clockwise as shown in the figure, and thus the processing surface of the molding member 5 was made to continuously abut on the outer peripheral surface of the cylindrical electrophotographic photosensitive member 1.

In the same manner, all the produced cylindrical electrophotographic photosensitive members were processed, and thus there were obtained a total number of 1000 of cylindrical electrophotographic photosensitive members each having an uneven structure formed on the surface thereof. For each of the second and later cylindrical electrophotographic photosensitive members, the rotation magnitude of the stepping motor was set to be the same as the rotation magnitude recorded at the time of the processing of the first cylindrical electrophotographic photosensitive member. In the processing of all the cylindrical electrophotographic photosensitive members, the outer peripheral surface of the shaft member 107 was never brought into contact with the inner peripheral surface of the abutting member 106.

Example 201

In the same manner as in Example 101, 1000 cylindrical electrophotographic photosensitive members were produced. Into the interior of each of the cylindrical electrophotographic photosensitive members, inserted was an insert 204, as shown in FIG. 1E, including a columnar abutting member 206 having a central portion 208 and an expanded portion 209, and a columnar shaft member 207 passing through the abutting member 206. In this insertion, the insertion was performed in such a manner that the central position of the cylindrical electrophotographic photosensitive member 1 in the axial direction and the central position of the abutting member 206 in the axial direction coincided with each other. As the material for the abutting member 206, a cast iron having a longitudinal elastic modulus E of $100 \times 10^3$ N/mm$^2$ was used. As the material for the shaft member 207, a sintered steel having a longitudinal elastic modulus E of $540 \times 10^3$ N/mm$^2$ was used. The length in the axial direction and the outer diameter of the abutting member 206 were set at 372.0 mm and 28.3 mm, respectively. The inner diameter of the central portion 208 of the abutting member 206 and the inner diameter of the expanded portion 209 of the abutting member 206 were set at 10.0 mm 26.3 mm, respectively. The Ls interval 211, the distance from the end of the central portion 208 in the axial direction to the end of the coated region of the surface layer 3 of the cylindrical electrophotographic photosensitive member 1 was set at 36.7 mm. The cross-sectional second moment Is in the Ls interval 211 of the abutting member 206 was calculated to be $8.0 \times 10^3$ mm$^4$. The outer diameter and the length of the shaft member 207 were set at 9.98 mm and 440 mm, respectively.

Otherwise in the same manner as in Example 101, all the 1000 produced cylindrical electrophotographic photosensitive members were processed sequentially one by one, and thus there were obtained a total number of 1000 of cylindrical electrophotographic photosensitive members each having an uneven structure formed on the surface of the surface layer (protective layer) thereof. For each of the second and later cylindrical electrophotographic photosensitive members, the rotation magnitude of the stepping motor was set to be the same as the rotation magnitude recorded at the time of the processing of the first cylindrical electrophotographic photosensitive member. In the processing of all the cylindrical electrophotographic photosensitive members, the outer peripheral surface of the shaft member 107 was never brought into contact with the expanded portions and the end portions of the abutting member.

Examples 202 to 242

In the same manner as in Example 201, in each of Examples 202 to 242, 1000 cylindrical electrophotographic photosensitive members (the cylindrical electrophotographic photosensitive members before the uneven structure was formed on the surface of the surface layer (protective layer)) were produced.

Next, under the same conditions as in Example 201 except that the conditions shown in Table 2 were adopted, in each of Examples 202 to 242, the 1000 cylindrical electrophotographic photosensitive members were subjected to a surface processing, and thus 1000 cylindrical electrophotographic photosensitive members each having an uneven structure formed on the surface of the surface layer (protective layer) were produced. The shaft member 207 was used by adjusting the outer diameter of the shaft member 207 in such a manner that when the shaft member 207 was pressed toward the molding member 5 at the time of processing, at the time point where monitored value of the load cell reached the M value shown in Table 2, a gap was able to be maintained between the end portion of the abutting member 206 and the shaft member 207. In each of Examples 202 to 242, the material used for the shaft member 207 was the same as the material for the shaft member 207 in Example 201.

Examples 243 to 251

In each of Examples 243 to 251, 1000 cylindrical electrophotographic photosensitive members (the cylindrical electrophotographic photosensitive members before the uneven structure was formed on the surface of the surface layer (protective layer)) were produced in the same manner as in Example 1 except that an aluminum alloy (A6063) cylinder having an outer diameter of 24.0 mm, a length of 263.0 mm and a wall thickness of 0.75 mm was used as the cylindrical substrate.

Next, the conditions shown in Table 2 were adopted, and an abutting member 206 having an outer diameter of 22.3 mm and a length of 265.0 mm was used. The shaft member 107 was used by adjusting the outer diameter of the shaft member 207 in such a manner that when the shaft member 207 was pressed toward the molding member 5 at the time of processing, at the time point where the monitored value of the load cell reached the M value shown in Table 2, a gap was able to be maintained between the end portion of the abutting member 206 and the shaft member 207. In each of Examples 243 to 251, the material used for the shaft member 207 was the same as the material for the shaft member 207 in Example 201. In each of Examples 243 to 251, otherwise under the same conditions as in Example 201, the 1000 cylindrical electrophotographic photosensitive members were subjected to a surface processing, and thus 1000 cylindrical electrophotographic photosensitive members each having an uneven structure formed on the surface of the surface layer (protective layer) were produced.

(Evaluation)

The 1000 cylindrical electrophotographic photosensitive members (the cylindrical electrophotographic photosensitive members each having an uneven structure formed on the surface of the surface layer (protective layer)) obtained in each of Examples 201 to 251 were evaluated in the same manner as in Example 101. The evaluation results thus obtained are shown in Table 2.

The insert used in each of Examples 201 to 251 had a structure composed of two or more members as compared to the insert used in Example 1, and accordingly, was able to be produced at a lower load of production than the insert used in Example 1.

TABLE 2

| Example No. | Ls [mm] | Shaft diameter [mm] | Inner diameter [mm] | Is [$10^3$ mm$^4$] | M [N] | E [$10^3$ N/mm$^2$] | Fs [$10^{-4}$ mm] | NG number |
|---|---|---|---|---|---|---|---|---|
| 201 | 66.1 | 10 | 26.9 | 5.8 | 2000 | 100 | 3323.33 | 13 |
| 202 | 36.7 | 5 | 6.3 | 31.4 | 50 | 100 | 2.62 | 9 |
| 203 | 66.1 | 10 | 27.3 | 4.2 | 3000 | 204 | 3348.83 | 12 |
| 204 | 36.7 | 10 | 25.9 | 9.4 | 35 | 204 | 3.01 | 10 |
| 205 | 69.7 | 10 | 27.7 | 2.6 | 4000 | 540 | 3236.77 | 10 |
| 206 | 36.7 | 10 | 26.3 | 8.0 | 50 | 540 | 1.91 | 8 |
| 207 | 73.4 | 10 | 26.3 | 8.0 | 2000 | 100 | 3295.18 | 6 |
| 208 | 128.5 | 10 | 26.3 | 8.0 | 400 | 100 | 3532.02 | 5 |
| 209 | 128.5 | 10 | 26.3 | 8.0 | 800 | 204 | 3462.77 | 6 |
| 210 | 128.5 | 10 | 26.3 | 8.0 | 2300 | 540 | 3760.95 | 6 |
| 211 | 179.8 | 10 | 26.3 | 8.0 | 150 | 100 | 3634.45 | 4 |
| 212 | 179.8 | 10 | 26.3 | 8.0 | 300 | 204 | 3563.19 | 4 |
| 213 | 179.8 | 10 | 26.3 | 8.0 | 800 | 540 | 3589.58 | 5 |
| 214 | 73.4 | 5 | 6.3 | 31.4 | 50 | 100 | 20.98 | 1 |
| 215 | 73.4 | 5 | 6.3 | 31.4 | 50 | 204 | 10.29 | 0 |
| 216 | 73.4 | 5 | 6.3 | 31.4 | 50 | 540 | 3.89 | 0 |
| 217 | 73.4 | 10 | 22.3 | 19.3 | 1900 | 100 | 1294.57 | 1 |
| 218 | 73.4 | 10 | 22.3 | 19.3 | 1500 | 204 | 501.00 | 1 |
| 219 | 73.4 | 10 | 22.3 | 19.3 | 1500 | 540 | 189.27 | 0 |
| 220 | 73.4 | 10 | 26.3 | 8.0 | 1900 | 100 | 3130.42 | 2 |
| 221 | 73.4 | 10 | 26.3 | 8.0 | 1500 | 204 | 1211.46 | 1 |
| 222 | 73.4 | 10 | 26.3 | 8.0 | 1500 | 540 | 457.66 | 1 |
| 223 | 73.4 | 10 | 26.3 | 8.0 | 3000 | 204 | 2422.93 | 2 |
| 224 | 73.4 | 10 | 26.3 | 8.0 | 3000 | 540 | 915.33 | 1 |
| 225 | 128.5 | 6 | 8.3 | 31.3 | 50 | 100 | 113.02 | 0 |
| 226 | 128.5 | 6 | 8.3 | 31.3 | 50 | 204 | 55.40 | 0 |
| 227 | 128.5 | 6 | 8.3 | 31.3 | 50 | 540 | 20.93 | 0 |
| 228 | 128.5 | 12 | 22.3 | 19.3 | 350 | 100 | 1278.07 | 0 |
| 229 | 128.5 | 12 | 22.3 | 19.3 | 720 | 204 | 1288.81 | 0 |
| 230 | 128.5 | 12 | 22.3 | 19.3 | 1900 | 540 | 1284.83 | 0 |
| 231 | 128.5 | 10 | 26.3 | 8.0 | 350 | 100 | 3090.52 | 1 |
| 232 | 128.5 | 10 | 26.3 | 8.0 | 720 | 204 | 3116.49 | 1 |
| 233 | 128.5 | 10 | 26.3 | 8.0 | 1900 | 540 | 3106.87 | 1 |
| 234 | 179.8 | 9 | 10.3 | 30.9 | 50 | 100 | 313.34 | 0 |
| 235 | 179.8 | 9 | 10.3 | 30.9 | 50 | 204 | 153.60 | 0 |
| 236 | 179.8 | 9 | 10.3 | 30.9 | 50 | 540 | 58.03 | 0 |
| 237 | 179.8 | 12 | 22.3 | 19.3 | 130 | 100 | 1302.61 | 0 |
| 238 | 179.8 | 12 | 22.3 | 19.3 | 260 | 204 | 1277.07 | 0 |
| 239 | 179.8 | 12 | 22.3 | 19.3 | 700 | 540 | 1298.90 | 0 |
| 240 | 179.8 | 10 | 26.3 | 8.0 | 125 | 100 | 3028.71 | 2 |
| 241 | 179.8 | 10 | 26.3 | 8.0 | 260 | 204 | 3088.10 | 1 |
| 242 | 179.8 | 10 | 26.3 | 8.0 | 700 | 540 | 3140.89 | 1 |
| 243 | 49.4 | 10 | 19.9 | 2.4 | 2000 | 100 | 3335.65 | 12 |
| 244 | 127.4 | 10 | 20.9 | 4.4 | 200 | 100 | 3104.12 | 2 |
| 245 | 52.0 | 5 | 21.1 | 2.8 | 1800 | 100 | 3042.28 | 2 |
| 246 | 49.4 | 10 | 19.9 | 2.0 | 3400 | 204 | 3290.74 | 11 |
| 247 | 127.4 | 10 | 20.9 | 4.4 | 400 | 204 | 3043.26 | 1 |
| 248 | 52.0 | 8 | 21.3 | 2.8 | 3000 | 204 | 2485.52 | 1 |
| 249 | 78.0 | 10 | 20.9 | 3.8 | 3000 | 540 | 2310.72 | 9 |
| 250 | 127.4 | 10 | 20.9 | 2.8 | 660 | 540 | 3037.91 | 1 |
| 251 | 52.0 | 8 | 20.3 | 2.8 | 3000 | 540 | 938.97 | 1 |

Example 252

The uneven structure of the molding member 5 was transferred to the whole region of the surface of the cylindrical electrophotographic photosensitive member 1 in the same manner as in Example 201 except that the same insert 204 as used in Example 201 was used in such a manner that when the abutting member 206 of the insert 204 was moved closer to the molding member 5, the apparatus structure as shown in FIG. 4 was used for the purpose of pressing the surface of the cylindrical electrophotographic photosensitive member 1 against the molding member 5.

In Example 252, for the purpose of pressing the cylindrical electrophotographic photosensitive member 1 against the molding member 5 by moving the abutting member 206 closer to the molding member 5, the supporting member 13 was provided with a not-shown loading mechanism. The loading mechanism is provided with a guide rail and a ball screw in the vertical direction, and further with a connection supporting member vertically movable in connection with the ball screw and the guide rail. The ball screw was connected to a stepping motor to be rotated and to vertically move the connection supporting member along the guide rail. The guide rail along which the connection supporting member vertically moves, the ball screw and the shaft member 207 were all designed to be supported with reference to one and the same frame. The frame and each of the end portions of the shaft member 207 were connected with a ball joint. The supporting member 13 and the frame were designed to be connected through a load cell, so as to enable the monitoring of the load magnitude pressing the molding member 5 against the shaft member 207.

In performing the processing, first the stepping motor was made to rotate and the molding member 5 was pressed toward the shaft member 207 until the monitoring value of the load cell reached 2000 N, and the rotation magnitude of the stepping motor at this time was recorded. Next, by moving the supporting member 13 from the right hand side to the left hand side of FIG. 4, the cylindrical electrophotographic photosensitive member 1 was rotated clockwise as shown in the figure, and thus the processing surface of the molding member 5 was made to continuously abut on the outer peripheral surface of the cylindrical electrophotographic photosensitive member 1.

In the same manner, all the produced cylindrical electrophotographic photosensitive members were processed, and thus there were obtained a total number of 1000 of cylindrical electrophotographic photosensitive members each having an uneven structure formed on the surface thereof. For each of the second and later cylindrical electrophotographic photosensitive members, the rotation magnitude of the stepping motor was set to be the same as the rotation magnitude recorded at the time of the processing of the first cylindrical electrophotographic photosensitive member. In the processing of all the cylindrical electrophotographic photosensitive members, the outer peripheral surface of the shaft member 207 was never brought into contact with the inner peripheral surface of the abutting member 206.

Example 301

In the same manner as in Example 101, 1000 cylindrical electrophotographic photosensitive members were produced. Into the interior of each of the cylindrical electrophotographic photosensitive members, inserted was an insert 304, as shown in FIG. 1G, including a cylindrical abutting member 306, a connecting member 308 and a columnar shaft member 307 passing through the connecting member 308. In this insertion, the insertion was performed in such a manner that the central position of the cylindrical electrophotographic photosensitive member 1 in the axial direction and the central position of the abutting member 306 in the axial direction coincided with each other. As the material for the abutting member 306, a cast iron having a longitudinal elastic modulus E of $100 \times 10^3$ N/mm² was used. As the material for the connecting member 308, polyether ether ketone was used. As the material for the shaft member 307, a sintered steel having a longitudinal elastic modulus E of $540 \times 10^3$ N/mm² was used. The length in the axial direction, the outer diameter and the inner diameter of the abutting member 306 were set at 372.0 mm, 28.3 mm and 26.3 mm, respectively. The outer diameter and the inner diameter of the connecting member 308 were set at 26.2 mm and 10.0 mm, respectively. The Ls interval 311, the distance from the position corresponding to the end of the connecting member 308 in the axial direction to the end of the coated region of the surface layer 3 of the cylindrical electrophotographic photosensitive member 1 was set at 36.7 mm. The cross-sectional second moment Is in the Ls interval 311 of the abutting member 306 was calculated to be $8.0 \times 10^3$ mm⁴. The outer diameter and the length of the shaft member 307 were set at 9.98 mm and 440 mm, respectively.

Otherwise in the same manner as in Example 201, all the 1000 produced cylindrical electrophotographic photosensitive members were processed sequentially one by one, and thus there were obtained a total number of 1000 of cylindrical electrophotographic photosensitive members each having an uneven structure formed on the surface of the surface layer (protective layer) thereof. For each of the second and later cylindrical electrophotographic photosensitive members, the rotation magnitude of the stepping motor was set to be the same as the rotation magnitude recorded at the time of the processing of the first cylindrical electrophotographic photosensitive member. In the processing of all the cylindrical electrophotographic photosensitive members, the outer peripheral surface of the shaft member was never brought into contact with the Ls interval and the end portions of the abutting member.

Examples 302 to 342

In the same manner as in Example 301, in each of Examples 302 to 342, 1000 cylindrical electrophotographic photosensitive members (the cylindrical electrophotographic photosensitive members before the uneven structure was formed on the surface of the surface layer (protective layer)) were produced.

Next, under the same conditions as in Example 301 except that the conditions shown in Table 3 were adopted, in each of Examples 302 to 342, the 1000 cylindrical electrophotographic photosensitive members were subjected to a surface processing, and thus 1000 cylindrical electrophotographic photosensitive members each having an uneven structure formed on the surface of the surface layer (protective layer) were produced. The shaft member 307 was used by adjusting the outer diameter of the shaft member 307 in such a manner that when the shaft member 307 was pressed toward the molding member 5 at the time of processing, at the time point where monitored value of the load cell reached the M value shown in Table 3, a gap was able to be maintained between the end portion of the abutting member 306 and the shaft member 307. In each of Examples 302 to 342, the material used for the shaft member 307 was the same as the material for the shaft member 307 in Example 301.

Examples 343 to 351

In each of Examples 343 to 351, 1000 cylindrical electrophotographic photosensitive members (the cylindrical electrophotographic photosensitive members before the uneven structure was formed on the surface of the surface layer (protective layer)) were produced in the same manner as in Example 1 except that an aluminum alloy (A6063) cylinder having an outer diameter of 24.0 mm, a length of 263.0 mm and a wall thickness of 0.75 mm was used as the cylindrical substrate.

Next, under the same conditions as in Example 301 except that the conditions shown in Table 3 were adopted and an abutting member 306 having an outer diameter of 22.3 mm and a length of 265.0 mm was used, in each of Examples 343 to 351, the 1000 cylindrical electrophotographic photosensitive members were subjected to a surface processing, and thus 1000 cylindrical electrophotographic photosensitive members each having an uneven structure formed on the surface of the surface layer (protective layer) were produced. The connecting member 307 was used by adjusting the outer diameter of the connecting member 307 in such a manner that when the connecting member 307 was pressed toward the molding member 5 at the time of processing, at the time point where monitored value of the load cell reached the M value shown in Table 3, a gap was able to be maintained between the end portion of the abutting member 306 and the connecting member 307. In each of Examples 343 to 351, the material used for the shaft member 307 was the same as the material for the shaft member 307 in Example 301.

(Evaluation)

The 1000 cylindrical electrophotographic photosensitive members (the cylindrical electrophotographic photosensitive members each having an uneven structure formed on the surface of the surface layer (protective layer)) obtained in each of Examples 301 to 351 were evaluated in the same manner as in Example 101. The evaluation results thus obtained are shown in Table 3.

The insert used in each of Examples 301 to 351 had a structure composed of two or more members as compared to the insert used in Example 1, and accordingly, was able to be produced at a lower load of production than the insert used in Example 1.

cylindrical electrophotographic photosensitive member 1 against the molding member 5.

In Example 352, for the purpose of pressing the cylindrical electrophotographic photosensitive member 1 against the molding member 5 by moving the abutting member 306 closer to the molding member 5, the supporting member 13 was provided with a not-shown loading mechanism. The

TABLE 3

| Example No. | Ls [mm] | Shaft diameter [mm] | Inner diameter [mm] | Is [$10^3$ mm$^4$] | M [N] | E [$10^3$ N/mm$^2$] | Fs [$10^{-4}$ mm] | NG number |
|---|---|---|---|---|---|---|---|---|
| 301 | 66.1 | 10 | 26.9 | 5.8 | 2000 | 100 | 3323.33 | 16 |
| 302 | 36.7 | 5 | 6.3 | 31.4 | 50 | 100 | 2.62 | 11 |
| 303 | 66.1 | 10 | 27.3 | 4.2 | 3000 | 204 | 3348.83 | 13 |
| 304 | 36.7 | 10 | 25.9 | 9.4 | 35 | 204 | 3.01 | 12 |
| 305 | 69.7 | 10 | 27.7 | 2.6 | 4000 | 540 | 3236.77 | 13 |
| 306 | 36.7 | 10 | 26.3 | 8.0 | 50 | 540 | 1.91 | 11 |
| 307 | 73.4 | 10 | 26.3 | 8.0 | 2000 | 100 | 3295.18 | 8 |
| 308 | 128.5 | 10 | 26.3 | 8.0 | 400 | 100 | 3532.02 | 6 |
| 309 | 128.5 | 10 | 26.3 | 8.0 | 800 | 204 | 3462.77 | 7 |
| 310 | 128.5 | 10 | 26.3 | 8.0 | 2300 | 540 | 3760.95 | 9 |
| 311 | 179.8 | 10 | 26.3 | 8.0 | 150 | 100 | 3634.45 | 6 |
| 312 | 179.8 | 10 | 26.3 | 8.0 | 300 | 204 | 3563.19 | 7 |
| 313 | 179.8 | 10 | 26.3 | 8.0 | 800 | 540 | 3589.58 | 8 |
| 314 | 73.4 | 5 | 6.3 | 31.4 | 50 | 100 | 20.98 | 3 |
| 315 | 73.4 | 5 | 6.3 | 31.4 | 50 | 204 | 10.29 | 2 |
| 316 | 73.4 | 5 | 6.3 | 31.4 | 50 | 540 | 3.89 | 2 |
| 317 | 73.4 | 10 | 22.3 | 19.3 | 1900 | 100 | 1294.57 | 3 |
| 318 | 73.4 | 10 | 22.3 | 19.3 | 1500 | 204 | 501.00 | 4 |
| 319 | 73.4 | 10 | 22.3 | 19.3 | 1500 | 540 | 189.27 | 2 |
| 320 | 73.4 | 10 | 26.3 | 8.0 | 1900 | 100 | 3130.42 | 4 |
| 321 | 73.4 | 10 | 26.3 | 8.0 | 1500 | 204 | 1211.46 | 3 |
| 322 | 73.4 | 10 | 26.3 | 8.0 | 1500 | 540 | 457.66 | 1 |
| 323 | 73.4 | 10 | 26.3 | 8.0 | 3000 | 204 | 2422.93 | 3 |
| 324 | 73.4 | 10 | 26.3 | 8.0 | 3000 | 540 | 915.33 | 2 |
| 325 | 128.5 | 6 | 8.3 | 31.3 | 50 | 100 | 113.02 | 2 |
| 326 | 128.5 | 6 | 8.3 | 31.3 | 50 | 204 | 55.40 | 2 |
| 327 | 128.5 | 6 | 8.3 | 31.3 | 50 | 540 | 20.93 | 3 |
| 328 | 128.5 | 12 | 22.3 | 19.3 | 350 | 100 | 1278.07 | 2 |
| 329 | 128.5 | 12 | 22.3 | 19.3 | 720 | 204 | 1288.81 | 2 |
| 330 | 128.5 | 12 | 22.3 | 19.3 | 1900 | 540 | 1284.83 | 2 |
| 331 | 128.5 | 10 | 26.3 | 8.0 | 350 | 100 | 3090.52 | 3 |
| 332 | 128.5 | 10 | 26.3 | 8.0 | 720 | 204 | 3116.49 | 3 |
| 333 | 128.5 | 10 | 26.3 | 8.0 | 1900 | 540 | 3106.87 | 3 |
| 334 | 179.8 | 9 | 10.3 | 30.9 | 50 | 100 | 313.34 | 2 |
| 335 | 179.8 | 9 | 10.3 | 30.9 | 50 | 204 | 153.60 | 1 |
| 336 | 179.8 | 9 | 10.3 | 30.9 | 50 | 540 | 58.03 | 2 |
| 337 | 179.8 | 12 | 22.3 | 19.3 | 130 | 100 | 1302.61 | 0 |
| 338 | 179.8 | 12 | 22.3 | 19.3 | 260 | 204 | 1277.07 | 1 |
| 339 | 179.8 | 12 | 22.3 | 19.3 | 700 | 540 | 1298.90 | 0 |
| 340 | 179.8 | 10 | 26.3 | 8.0 | 125 | 100 | 3028.71 | 3 |
| 341 | 179.8 | 10 | 26.3 | 8.0 | 260 | 204 | 3088.10 | 2 |
| 342 | 179.8 | 10 | 26.3 | 8.0 | 700 | 540 | 3140.89 | 3 |
| 343 | 49.4 | 10 | 19.9 | 2.4 | 2000 | 100 | 3335.65 | 14 |
| 344 | 127.4 | 10 | 20.9 | 4.4 | 200 | 100 | 3104.12 | 3 |
| 345 | 52.0 | 5 | 21.1 | 2.8 | 1800 | 100 | 3042.28 | 3 |
| 346 | 49.4 | 10 | 19.9 | 2.0 | 3400 | 204 | 3290.74 | 13 |
| 347 | 127.4 | 10 | 20.9 | 4.4 | 400 | 204 | 3043.26 | 2 |
| 348 | 52.0 | 8 | 21.3 | 2.8 | 3000 | 204 | 2485.52 | 3 |
| 349 | 78.0 | 10 | 20.9 | 3.8 | 3000 | 540 | 2310.72 | 11 |
| 350 | 127.4 | 10 | 20.9 | 2.8 | 660 | 540 | 3037.91 | 2 |
| 351 | 52.0 | 8 | 20.3 | 2.8 | 3000 | 540 | 938.97 | 3 |

Example 352

The uneven structure of the molding member 5 was transferred to the whole region of the surface of the cylindrical electrophotographic photosensitive member 1 in the same manner as in Example 301 except that the same insert 304 as used in Example 301 was used in such a manner that when the abutting member 306 of the insert 304 was moved closer to the molding member 5, the apparatus structure as shown in FIG. 4 was used for the purpose of pressing the surface of the loading mechanism was provided with a guide rail and a ball screw in the vertical direction, and further with a connection supporting member vertically movable in connection with the ball screw and the guide rail. The ball screw was connected to a stepping motor to be rotated and to vertically move the connection supporting member along the guide rail. The guide rail along which the connection supporting member vertically moves, the ball screw and the shaft member 307 were all designed to be supported with reference to one and the same frame. The frame and each of the end portions of the shaft member 307 were connected with a ball joint. The supporting member 13 and the frame were designed to be connected through a load cell, so as to enable the monitoring of the load magnitude pressing the molding member 5 against the shaft member 307.

In performing the processing, first the stepping motor was made to rotate and the molding member 5 was pressed toward the shaft member 307 until the monitoring value of the load cell reached 2000 N, and the rotation magnitude of the stepping motor at this time was recorded. Next, by moving the supporting member 13 from the right hand side to the left hand side of FIG. 4, the cylindrical electrophotographic photosensitive member 1 was rotated clockwise as shown in the figure, and thus the processing surface of the molding member 5 was made to continuously abut on the outer peripheral surface of the cylindrical electrophotographic photosensitive member 1.

In the same manner, all the produced cylindrical electrophotographic photosensitive members were processed, and thus there were obtained a total number of 1000 of cylindrical electrophotographic photosensitive members each having an uneven structure formed on the surface thereof. For each of the second and later cylindrical electrophotographic photosensitive members, the rotation magnitude of the stepping motor was set to be the same as the rotation magnitude recorded at the time of the processing of the first cylindrical electrophotographic photosensitive member. In the processing of all the cylindrical electrophotographic photosensitive members, the outer peripheral surface of the shaft member 307 was never brought into contact with the inner peripheral surface of the abutting member 306.

Comparative Examples 1 to 6

In each of Comparative Examples 1 to 6, 1000 cylindrical electrophotographic photosensitive members (the cylindrical electrophotographic photosensitive members before the uneven structure was formed on the surface of the surface layer (protective layer)) were produced in the same manner as in Example 101.

Next, in each of Comparative Examples 1 to 6, under the same conditions as in Example 101 except that the conditions shown in Table 4 were adopted and an insert 12 as shown in FIG. 3 was used, the 1000 cylindrical electrophotographic photosensitive members were subjected to a surface processing, and thus 1000 cylindrical electrophotographic photosensitive members each having an uneven structure formed on the surface of the surface layer (protective layer) were produced. The outer diameter of the portion, to be inserted into the interior of the cylindrical electrophotographic photosensitive member 1, of the insert 12 used in Comparative Example 1 to 6 was set at 28.3 mm, the same value as the outer diameter of the abutting member 106 used in Example 101. In the insert 12 used in Comparative Examples 1 to 6, a gap such as the gap 110 in FIG. 1C was not present, accordingly the Ls interval 111 is also not present, and hence in Table 4, no values of Is and Fs are shown.

(Evaluation)

The 1000 cylindrical electrophotographic photosensitive members (the cylindrical electrophotographic photosensitive members each having an uneven structure formed on the surface of the surface layer (protective layer)) obtained in each of Comparative Examples 1 to 6 were evaluated in the same manner as in Example 101. The evaluation results thus obtained are shown in Table 4.

TABLE 4

| Comparative Example No. | Ls [mm] | Shaft diameter [mm] | Inner diameter [mm] | Is [$10^3$ mm$^4$] | M [N] | E [$10^3$ N/mm$^2$] | Fs [$10^{-4}$ mm] | NG number |
|---|---|---|---|---|---|---|---|---|
| 1 | 0.0 | — | — | — | 500 | 100 | — | 25 |
| 2 | 0.0 | — | — | — | 50 | 100 | — | 24 |
| 3 | 0.0 | — | — | — | 1500 | 204 | — | 23 |
| 4 | 0.0 | — | — | — | 50 | 204 | — | 19 |
| 5 | 0.0 | — | — | — | 3000 | 540 | — | 22 |
| 6 | 0.0 | — | — | — | 50 | 540 | — | 19 |

This application claims the benefit of Japanese Patent Application Nos. 2010-264131, filed Nov. 26, 2010, 2011-008851, filed Jan. 19, 2011, 2011-031839, filed Feb. 17, 2011, and 2011-245723, filed Nov. 9, 2011, which are hereby incorporated by reference herein in their entirety.

The invention claimed is:

1. A process for forming an uneven structure on a surface of a cylindrical electrophotographic photosensitive member comprising a cylindrical substrate and a surface layer, the process comprising the steps of:
(i) inserting an insert into the cylindrical substrate, and
(ii) bringing into contact a molding member having a surface structure corresponding to the uneven structure on a surface thereof with the surface of the surface layer, and transferring the surface structure on the surface of the molding member to the surface of the surface layer, the insert comprising:
a shaft part;
an abutting part positioned outside of the shaft part in a radial direction, the abutting part having:
an outer peripheral surface which contacts with an inner peripheral surface of the cylindrical substrate when the insert is inserted into the cylindrical substrate; and
an inner peripheral surface facing an outer peripheral surface of the shaft part with a gap at both end portions thereof in a axial direction; and
a connecting part connecting the abutting part and the shaft part, wherein,
the step (ii) further comprises:
(a) applying force on both end portions of the shaft part in an axial direction, and bringing the surface of the surface layer into pressure contact with the surface of the molding member, so as to press the outer peripheral surface of the abutting part against the inner peripheral surface of the cylindrical substrate, while maintaining the gap in such a manner that the outer peripheral surface of the shaft part and the inner peripheral surface of the abutting part are not in contact with each other, or
(b) supporting both end portions of the shaft part in an axial direction, and applying force to the molding member, and bringing the surface of the molding member into pressure contact with the surface of the surface layer, so as to press the inner peripheral surface of the cylindrical substrate against the outer peripheral surface of the abutting part, while maintaining the gap in such a manner that the outer peripheral surface of the shaft part and the inner peripheral surface of the abutting part are not in contact with each other.

2. The process according to claim 1, wherein the insert comprises:
a shaft member which works as the shaft part and the connecting part; and
an abutting member which works as the abutting part.

3. The process according to claim 2, wherein when the length of the abutting member in the axial direction, corresponding to the coated region of the surface layer of the electrophotographic photosensitive member is represented by L [mm], and the length from the end of the central portion in the axial direction of the shaft member to the position corresponding to the end of the coated region of the surface layer of the electrophotographic photosensitive member is represented by Ls [mm], L and Ls satisfy the following formula (Mathematical Expression 1):

$0.20L \leq Ls \leq 0.49L$ (Mathematical Expression 1)

4. The process according to claim 3, wherein when the force falling within the range allowing the outer peripheral surface of the abutting member and the inner peripheral surface of the cylindrical substrate to be pressed against each other is represented by M [N], the longitudinal elastic modulus of the material of the abutting member is represented by E [N/mm$^2$], and the cross-sectional second moment of the abutting member from the end of the central portion in the axial direction of the shaft member to the position corresponding to the end of the coated region of the surface layer of the electrophotographic photosensitive member is represented by Is [mm$^4$], Fs [mm] defined by the following Mathematical Expression 3 satisfies the following Mathematical Expression 2:

$3.9 \times 10^{-4} \leq Fs \leq 3.1 \times 10^{-1}$ (Mathematical Expression 2)

$Fs = M \cdot Ls^3 / 3 \cdot E \cdot Is$ (Mathematical Expression 3).

5. The process according to claim 1, wherein the insert comprises:
a shaft member which works as the shaft part; and
an abutting member which works as the abutting part and the connecting part.

6. The process according to claim 5, wherein the length of the abutting member in the axial direction, corresponding to the coated region of the surface layer of the electrophotographic photosensitive member is represented by L [mm], and the length of the abutting member from the end of the central portion in the axial direction to the position corresponding to the end of the coated region of the surface layer of the electrophotographic photosensitive member is represented by Ls [mm], L and Ls satisfy the following formula (Mathematical Expression 1):

$0.20L \leq Ls \leq 0.49L$ (Mathematical Expression 1)

7. The process according to claim 6, wherein when the force falling within the range allowing the outer peripheral surface of the abutting member and the inner peripheral surface of the cylindrical substrate to be pressed against each other is represented by M [N], the longitudinal elastic modulus of the material of the abutting member is represented by E [N/mm$^2$], and cross-sectional second moment of the abutting member from the end of the central portion in the axial direction to the position corresponding to the end of the coated region of the surface layer of the electrophotographic photosensitive member is represented by Is [mm$^4$], Fs [mm] defined by the following Mathematical Expression 3 satisfies the following Mathematical Expression 2:

$3.9 \times 10^{-4} \leq Fs \leq 3.1 \times 10^{-1}$ (Mathematical Expression 2)

$Fs = M \cdot Ls^3 / 3 \cdot E \cdot Is$ (Mathematical Expression 3)

8. The process according to claim 1, wherein the insert comprises:
a shaft member which works as the shaft part;
an abutting member which works as the abutting part; and
a connecting member which works as the connecting part.

9. The process according to claim 8, wherein the length of the abutting member in the axial direction corresponding to the coated region of the surface layer of the electrophotographic photosensitive member is represented by L [mm], and the length from the end of the central portion in the axial direction of the shaft member to the position corresponding to the end of the coated region of the surface layer of the electrophotographic photosensitive member is represented by Ls [mm], L and Ls satisfy the following formula (Mathematical Expression 1):

$0.20L \leq Ls \leq 0.49L$ (Mathematical Expression 1)

10. The process according to claim 9, wherein when the force falling within the range allowing the outer peripheral surface of the abutting member and the inner peripheral surface of the cylindrical substrate to be pressed against each other is represented by M [N], the longitudinal elastic modulus of the material of the abutting member is represented by E [N/mm$^2$], and cross-sectional second moment of the abutting member from the position corresponding to the end of the central portion in the axial direction of the shaft member to the position corresponding to the end of the coated region of the surface layer of the electrophotographic photosensitive member is represented by Is [mm$^4$], Fs [mm] defined by the following Mathematical Expression 3 satisfies the following Mathematical Expression 2:

$3.9 \times 10^{-4} \leq Fs \leq 3.1 \times 10^{-1}$ (Mathematical Expression 2)

$Fs = M \cdot Ls^3 / 3 \cdot E \cdot Is$ (Mathematical Expression 3)

11. A process for producing a cylindrical electrophotographic photosensitive member having an uneven structure formed on the surface of the surface layer thereof, wherein the uneven structure is formed on the surface of the surface layer of the cylindrical electrophotographic photosensitive member with the process according to claim 1.

* * * * *